(12) United States Patent
Kuroda et al.

(10) Patent No.: US 7,920,506 B2
(45) Date of Patent: Apr. 5, 2011

(54) TRANSMISSION SCHEDULE CONSTRUCTING APPARATUS

(75) Inventors: Go Kuroda, Osaka (JP); Koji Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 11/660,917

(22) PCT Filed: Aug. 24, 2005

(86) PCT No.: PCT/JP2005/015837
§ 371 (c)(1),
(2), (4) Date: Feb. 23, 2007

(87) PCT Pub. No.: WO2006/022424
PCT Pub. Date: Mar. 2, 2006

(65) Prior Publication Data
US 2008/0095123 A1 Apr. 24, 2008

(30) Foreign Application Priority Data
Aug. 27, 2004 (JP) .................. 2004-248038

(51) Int. Cl.
*H04B 7/212* (2006.01)
(52) U.S. Cl. ..... 370/321; 370/310; 370/350; 455/550.1; 455/575.9
(58) Field of Classification Search .......... 370/310–350; 455/550.1–575.9
See application file for complete search history.

(56) References Cited

U.S. PATENT DOCUMENTS

| 5,828,293 | A | * | 10/1998 | Rickard | 375/257 |
|---|---|---|---|---|---|
| 6,314,084 | B1 | * | 11/2001 | Kahale et al. | 370/230 |
| 2002/0012332 | A1 | * | 1/2002 | Tiedemann et al. | 370/335 |
| 2003/0002459 | A1 | * | 1/2003 | Igarashi et al. | 370/330 |
| 2003/0223365 | A1 | * | 12/2003 | Kowalski | 370/230.1 |
| 2004/0047427 | A1 | | 3/2004 | Dostert et al. | |
| 2004/0070912 | A1 | * | 4/2004 | Kopp | 361/119 |
| 2005/0002335 | A1 | * | 1/2005 | Adamczyk et al. | 370/230 |
| 2005/0094675 | A1 | * | 5/2005 | Bhushan et al. | 370/527 |
| 2005/0152280 | A1 | * | 7/2005 | Pollin et al. | 370/252 |

OTHER PUBLICATIONS

Part 11: Wireless LAN Medium Access Control (MAC) and Physical Layer (PHY) Specifications, LAN MAN Standards Committee of the IEEE Computer Society, ANSI/IEEE Std 802.11, 1999 Edition (R2003), Jun. 12, 2003, IEEE-SA Standards Board, pp. 1-513.
L.W. Lim, R. Malik & P.Y. Tan, Panasonic Singapore Laboratories, "A QoS Scheduler for IEEE 802.11e WLANs", Consumer Communications and Networking Conference, CCNC 2004, First IEEE, Jan. 5-8, 2004, pp. 199-204.

* cited by examiner

*Primary Examiner* — Kent Chang
*Assistant Examiner* — Shahriar Behnamian
(74) *Attorney, Agent, or Firm* — Wenderoth, Lind & Ponack, L.L.P.

(57) ABSTRACT

A transmission schedule constructing apparatus constructing a transmission schedule for use in time division multiple access of stations on a power line communication network. The apparatus constructs the transmission schedule based on a cyclic change in a transmission quality of communication medium depending on an alternating current power source cycle on the power line and based on a parameter relating to transmission quality designated in the schedule allocation request.

11 Claims, 13 Drawing Sheets

FIG. 7
| STREAM NUMBER | TRANSMISSION RATE (CONVERTED TO PHYSICAL RATE) |
|---|---|
| 901 | 5Mbps |
| 902 | 50Mbps |
FIG. 8A
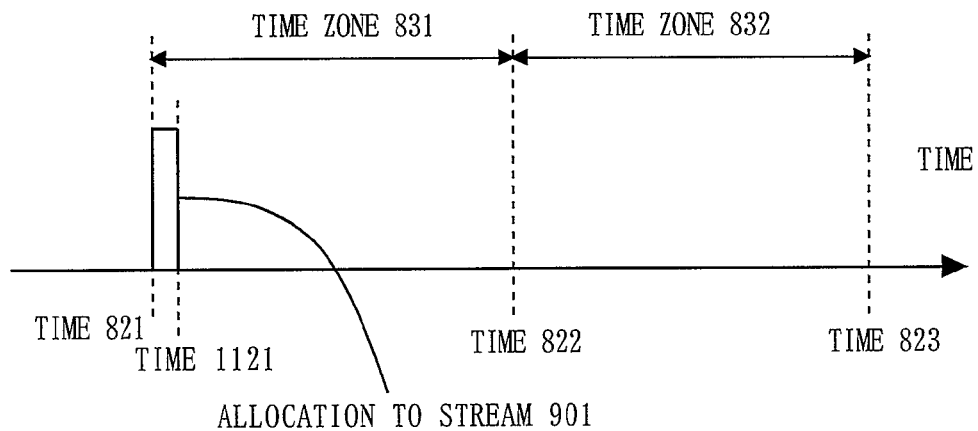
FIG. 8B
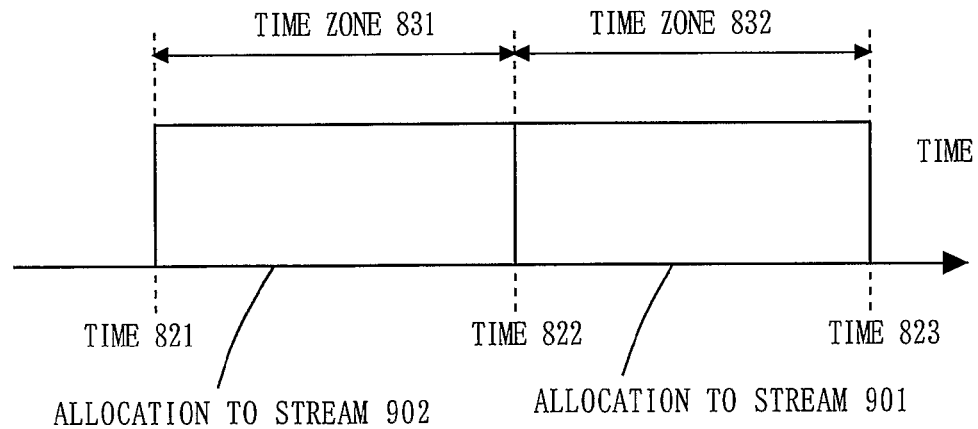

FIG. 11

| SLOT | AVERAGE PHYSICAL RATE | FRAME ERROR RATE |
|---|---|---|
| 1331 | 60Mbps | 0.01% |
| 1332 | 60Mbps | 0.01% |
| 1333 | 80Mbps | 1% |
| 1334 | 40Mbps | 1% |
| 1335 | 60Mbps | 0.01% |

FIG. 12

| STREAM NUMBER | TRANSMISSION RATE (CONVERTED TO PHYSICAL RATE) | UPPER LIMIT OF DELAY |
|---|---|---|
| 1501 | 12Mbps | 200msec |
| 1502 | 12Mbps | 5msec |

| STREAM NUMBER | TRANSMISSION RATE (CONVERTED TO PHYSICAL RATE) | PRESENCE OR ABSENCE OF RETRANSMISSION |
|---|---|---|
| 1601 | 12Mbps | PRESENCE OF RETRANSMISSION |
| 1602 | 12Mbps | ABSENCE OF RETRANSMISSION |

| AVERAGE DATA RATE |
|---|
| MINIMUM DATA RATE |
| PEAK DATA RATE |
| MINIMUM SERVICE INTERVAL |
| MAXIMUM SERVICE INTERVAL |
| DELAY RANGE |
| ⋮ |
| ⋮ |

FIG. 17  PRIOR ART
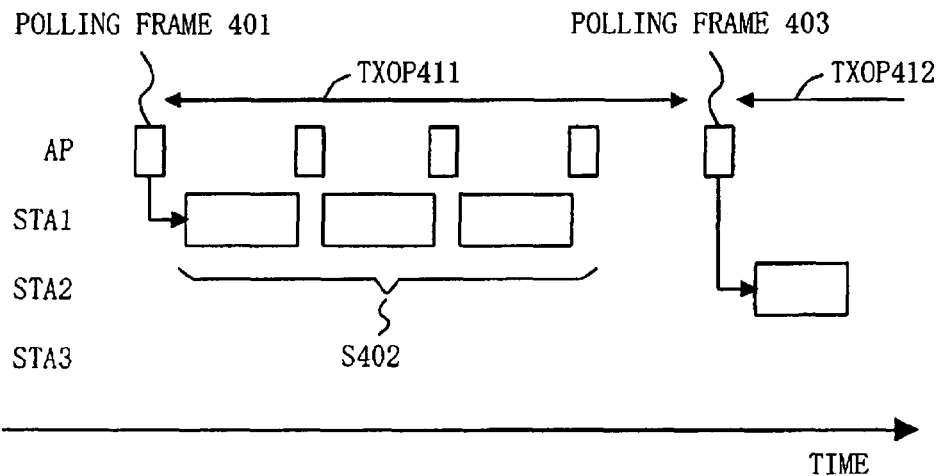
FIG. 18  PRIOR ART
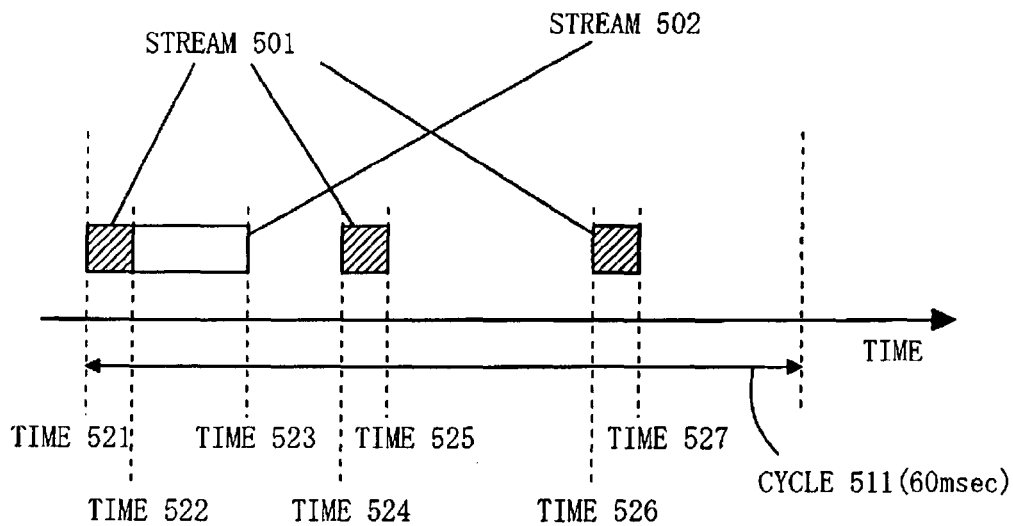
FIG. 19  PRIOR ART
| STREAM NUMBER | REQUIRED TIME REQUIREMENT | DELAY REQUIREMENT |
|---|---|---|
| 501 | 5 MSEC/1 TRANSMISSION TIMING | MAXIMUM 20 MSEC |
| 502 | 10 MSEC/1 CYCLE | MAXIMUM 200 MSEC |

TRANSMISSION SCHEDULE CONSTRUCTING APPARATUS

BACKGROUND OF THE INVENTION

1. Field of Invention

The present invention relates to an apparatus which is used on a power line communication network. More particularly, the present invention relates to a transmission schedule constructing apparatus capable of constructing a transmission schedule which is used when a station performs time division multiple access to a power line which is a communication medium.

2. Description of the Related Art

Conventionally, wireless LAN systems and the like have been commercialized as network communication systems in which a signal is transmitted based on a transmission schedule which is previously set by each terminal belonging to a network. For wireless LAN systems, there are standards, such as IEEE802.11b, which utilizes a 2.4-GHz band, IEEE802.11g, which utilizes a 5-GHz band, and the like. These standards are widely used. An attempt is being made to incorporate a concept of Quality of Service (QoS) into an upcoming version (IEEE802.11e) of these standards.

In IEEE802.11 wireless LAN, a control station which is called AP (Access Point) transmits a polling frame to a terminal station which is called STA (STAtion). Thereby, the STA is permitted to transmit a signal. Such a medium access method is called a Point Coordination Function (PCF). With PCF, each STA can perform frame transmission based on a transmission schedule determined by the AP (see IEEE Std 802.11, "Wireless LAN Medium Access Control (MAC) and Physical Layer (PHY) specifications").

FIG. 15 is a diagram illustrating an example of PCF medium access. An AP and three STAs (STA1 to STA3) constitute a wireless LAN network. The AP transmits a polling frame 201 to give transmission permission to the STA1. After the STA1 transmits a data frame 202, the AP transmits a polling frame 203 to the STA2. In response to this, the STA2 transmits a data frame 204. Further, the AP transmits a polling frame 205 to the STA3. In response to this, the STA3 transmits a data frame 206. Thereafter, the same sequence is performed between the AP and each STA, whereby continuous medium access is achieved.

In IEEE802.11e, a medium access method in which the concept of QoS is incorporated into PCF is discussed (see Consumer Communications and Networking Conference, 2004, CCNC 2004, First IEEE, 5-8, Jan. 2004, "A QoS scheduler for IEEE 802.11e WLANs"). In the method discussed in IEEE802.11e, occupation of a transmission medium is achieved by: (1) each STA requesting an AP for a medium occupation time, the STAs and the AP constituting a wireless LAN network; (2) the AP informing each STA of a medium occupation permission time; and (3) the informed STA performing transmission while occupying a medium.

Each STA which constitutes a wireless LAN network informs an AP of information including QoS parameters (TSPEC), such as a data transmission rate, an upper limit of tolerable delay time, and the like, to request an AP for a time for which the STA occupies a transmission medium. FIG. 16 is a diagram illustrating a portion of a list of TSPECs.

When receiving a request for a transmission medium occupation time, the AP schedules a transmission timing based on the requested TSPEC. Based on the transmission schedule thus produced, the AP transmits to each STA a polling frame including medium occupation time information which is called transmission opportunity (TXOP). All STAs other than an STA which has been polled by the AP confirm the TXOP in the polling frame and restrains from transmitting a frame in a time zone indicated by the TXOP. Thereby, each STA constituting an IEEE802.11e wireless LAN can exclusively use a transmission medium while satisfying QoS.

FIG. 17 is a diagram illustrating an exemplary medium access method which is discussed in IEEE802.11e. In a wireless LAN network composed of an AP and three STAs (STA1 to STA3), each STA is assumed to acquire a transmission medium occupation time using the TSPEC of FIG. 16. The AP transmits a polling frame 401 to the STA1. In this case, a time (TXOP) 411 for which the STA1 can occupy a medium is written in the polling frame 401. The STA1 transmits a data frame at a time indicated by the TXOP 411 (step S402). When the TXOP 411 is over, the AP designates TXOP and transmits a polling frame 403 to the next STA. In FIG. 17, the AP transmits a polling frame 403 including TXOP 412 to the STA2. This series of steps are repeatedly performed, thereby designating a time for which a medium is occupied by each STA.

Thus, the wireless LAN has a function to perform transmission based on scheduling by the AP. Note that there is a possibility that different transmission schedules may be constructed, depending on a scheduling method in the AP. It is here assumed that scheduling is performed in order of the time at which an allocation request is received.

FIG. 18 and FIG. 19 are diagrams for explaining a scheduling method which is performed in an AP in a wireless LAN. In an example illustrated in FIG. 18, it is assumed that, in a communication network system in which the same transmission schedule is performed in scheduling cycles 511 of 60 msec, the AP performs scheduling based on the following two policies.

The first scheduling policy is that scheduling is performed in order of the time at which an allocation request is received. The AP performs allocation with respect to a data stream in order of the time at which an allocation request is received. When a new allocation request is received, previous allocation is not changed.

The second scheduling policy is that allocation is performed from the head of an unallocated time without a space. Assuming that no allocation has been performed, when receiving a first allocation request, the AP invariably performs allocation from the head of the scheduling cycle 511. Thereafter, when receiving a second allocation request, the AP tries to allocate the earliest time of an unallocated time of the scheduling cycle 511.

It is assumed that the AP receives the following allocation requests. It is also assumed that the AP receives a data stream 501 whose maximum tolerable delay is 20 msec and which requires a time of 5 msec for performing transmission one time, and thereafter, receives a data stream 502 which requires a time of 20 msec in the scheduling cycle 511 and tolerates a maximum transmission delay of 200 msec. FIG. 19 illustrates requirements concerning a transmission time and a delay time of each data stream.

When receiving an allocation request of the data stream 501, the AP determines a time zone to be allocated which satisfies a requested QoS requirement. Specifically, the AP allocates 5 msec ranging from a starting time 521 to a time 522 of the scheduling cycle 511 to the data stream 501 based on the first scheduling policy. Next, the AP allocates 5 msec ranging from a time 524 which is 20 msec after the time 521 to a time 525 to the data stream 501. Thereby, one of the QoS requirements of the data stream 501 that the maximum delay time is 20 msec is satisfied. In addition, the AP allocates 5 msec ranging from a time 526 which is 20 msec after the time 524 to a time 527 to the data stream 501. Thus, allocation is competed which satisfies the QoS requirements requested by the data stream 501.

Further, the AP determines a time zone to be allocated to the data stream 502 in a manner which satisfies the QoS requirements of the data stream 502. The AP allocates to the data stream 502 10 msec from the time 522 at which the first allocation to the data stream 501 is ended in the scheduling cycle 511, so that one of the QoS requirements of the data stream 502 which is an allocation time requirement (10 msec per cycle) is satisfied. Thereby, all scheduling is completed while the QoS requirement of the data stream 502 is satisfied.

However, in a power line communication network in which a power line is used as a communication medium, a problem arises with the above-described scheduling method. Hereinafter, the problem will be described.

The power line communication network is characterized in that the transmission quality of communication medium changes in utility alternating current power source cycles or half cycles thereof. FIG. 20A is a diagram illustrating how the transmission quality changes in synchronization with the utility alternating current power source cycle. FIG. 20B is a diagram illustrating how the transmission quality changes in synchronization with the half cycle of the utility alternating current power source.

However, in conventional scheduling methods, such a change in transmission quality has not been sufficiently taken into consideration. Therefore, for example, the transmission quality may be degraded during data transmission, so that a transmission error occurs and data cannot be normally received. Alternatively, for example, a large volume of data may be transmitted during a time when the transmission quality is poor, so that the data occupies a communication medium for a long time.

The change in transmission quality illustrated in FIG. 20A and FIG. 20B generally has characteristics which vary among transmission and reception stations. FIG. 20C is a diagram illustrating an exemplary fluctuation in transmission quality of different pairs of transmission/reception stations. FIG. 20C illustrates a change 731 in transmission quality between a station A and a station B constituting a power line communication network, and a change 732 in transmission quality between a station C and a station D. Concerning the change 731 in transmission quality, the transmission quality is relatively good in the vicinity of a midpoint of a time zone between a time 741 and a time 742 which corresponds to one power source cycle. In contrast, concerning the change 732 in transmission quality, the transmission quality is relatively good in the vicinity of a head of the time zone between the time 741 and the time 742. Moreover, the change 732 in transmission quality is small compared to the change 731 in transmission quality. Thus, even when transmission quality between transmission and reception stations is taken into consideration, a problem, such as a transmission error or long-time occupation of a communication medium, may occur unless scheduling is performed.

Therefore, an object of the present invention is to provide a transmission schedule constructing apparatus capable of performing scheduling so that data transmission is efficiently and stably, by taking into consideration the transmission quality of a power line communication medium.

BRIEF SUMMARY OF THE INVENTION

To achieve the above object, the present invention has the following aspects. A first aspect of the present invention is directed to a transmission schedule constructing apparatus capable of constructing a transmission schedule for use in time division multiple access of stations on a power line communication network to a power line which is a communication medium. The apparatus includes an allocation request receiving section operable to receive a schedule allocation request within the apparatus and/or a schedule allocation request from other stations, and includes a transmission schedule constructing section operable to construct the transmission schedule based on a cyclic change in a transmission quality of the power line depending on an alternating current power source cycle and a parameter relating to transmission quality designated in the schedule allocation request.

According to the first aspect of the present invention, a transmission schedule which can achieve transmission quality requested by a parameter relating to transmission quality can be constructed, taking into consideration a cyclic change in transmission quality depending on an alternating current power source cycle. Therefore, a transmission schedule constructing apparatus capable of providing a schedule which allows efficient and stable data transmission is provided.

A scheduling policy for construction of the transmission schedule may be previously set in the transmission schedule constructing section. The transmission schedule constructing section may reset a current transmission schedule when a new schedule allocation request is received, and try to perform allocation for all schedule allocation requests currently received in accordance with the scheduling policy, and when the allocation is successful for all the schedule allocation requests, output the transmission schedule obtained by the allocation, and when the allocation is not successful for all the schedule allocation requests, recovers the transmission schedule before the resetting.

Thereby, the transmission schedule constructing apparatus can construct a transmission schedule complying with the scheduling policy every time a new schedule allocation request is issued.

Preferably, the transmission schedule constructing section may construct the transmission schedule in units of the alternating current power source cycle or an integral multiple of a half of the alternating current power source cycle.

In power line communication, a change in a transmission quality of communication medium depends on an alternating current power source cycle. Therefore, it is possible to construct a transmission schedule depending on the alternating current power source cycle.

Preferably, the change in the transmission quality may be a change in a physical transmission rate between stations transmitting/receiving data to be scheduled.

Thereby, a reference for construction of a transmission schedule becomes objective.

Preferably, the alternating current power source cycle or the integral multiple of the half of the alternating current power source cycle is divided into a plurality of time intervals, and the change in the transmission quality is represented by a change in an estimated average physical transmission rate of each of the time intervals.

Thereby, a change in transmission quality can be simplified and it can be made easy to construct a transmission schedule.

Preferably, the physical transmission rate between stations transmitting/receiving data to be scheduled may be obtained by evaluation of a transmission path between the stations.

In power line communication, a change in a transmission quality of communication medium is different between each pair of stations. Thereby, it is possible to obtain a change in a transmission quality which is different between each pair of stations, and construct a transmission schedule in consideration of the change in a transmission quality which is different between each pair of stations. When a transmission schedule is constructed in consideration of the change in a transmission quality which is different between each pair of stations, the transmission schedule constructing apparatus may determine a time zone to be allocated, based on a change in a transmission quality between a transmission station and a reception station in data transmission accompanying a schedule allocation request, a scheduling policy, and requested transmission quality. The transmission schedule constructing apparatus specifies the transmission station in data transmission accompanying the schedule allocation request in accordance with a definition of a communication protocol. Alternatively, the transmission scheduling constructing apparatus may determine that a station issuing the schedule allocation request is the transmission station in data transmission accompanying the schedule allocation request. Alternatively, the transmission station in data transmission accompanying the schedule allocation request may be explicitly described in the schedule allocation request. The reception station in data transmission accompanying the schedule allocation request is also specified in accordance with a definition of a communication protocol. Alternatively, the reception station in data transmission accompanying the schedule allocation request may be explicitly described in the schedule allocation request.

Preferably, a transmission rate requested by the schedule allocation request for data to be scheduled may be described in the parameter designated in the schedule allocation request, and the transmission schedule constructing section may construct the transmission schedule in a manner which satisfies a request for the transmission rate, in accordance with the change in the transmission quality.

Thereby, a transmission schedule is constructed in a manner which satisfies a requested transmission rate.

Preferably, the change in the transmission quality may be a change in a physical transmission rate between stations transmitting/receiving data to be scheduled, and the transmission schedule constructing section may allocate a time zone capable of providing a physical transmission rate higher than or equal to a predetermined second rate to data requesting a transmission rate higher than or equal to a predetermined first rate.

Thereby, a transmission schedule is constructed in a manner which satisfies a requested transmission rate using an objective reference.

Preferably, the change in the transmission quality may be a change in a physical transmission rate between stations transmitting/receiving data to be scheduled, and the transmission schedule constructing section may allocate a time zone capable of providing a physical transmission rate higher than or equal to a predetermined second rate to data requesting a transmission rate higher than or equal to a predetermined first rate.

Thereby, a transmission schedule is constructed in a manner which satisfies a requested transmission rate.

Preferably, a transmission delay time tolerated by data to be scheduled may be described in the parameter designated in the schedule allocation request, and the transmission schedule constructing section may construct the transmission schedule in a manner which satisfies a request for the transmission delay time, in accordance with the change in the transmission quality.

Thereby, a transmission schedule is constructed in a manner which satisfies a requested transmission delay time.

Preferably, the change in the transmission quality may be a change in a physical transmission rate between stations transmitting/receiving data to be scheduled, and the transmission schedule constructing section may allocate a time zone having a change rate of the physical transmission rate lower than or equal to a predetermined change rate to data requesting a transmission delay time lower than or equal to a predetermined delay time.

Thereby, a transmission schedule is constructed in a manner which satisfies a requested transmission delay time using an objective reference.

Preferably, the change in the transmission quality may be a change in a physical transmission rate between stations transmitting/receiving data to be scheduled, and the transmission schedule constructing section may allocate a time zone having a lower change rate of the physical transmission rate to data requesting a smaller transmission delay time.

Thereby, a transmission schedule is constructed in a manner which satisfies a requested transmission delay time.

Preferably, information about a request for retransmission of data may be described in the parameter designated in the schedule allocation request, and the transmission schedule constructing section may construct the transmission schedule in a manner which satisfies the retransmission request, in accordance with the change in the transmission quality.

Thereby, a transmission schedule is constructed in a manner which satisfies a requested retransmission condition.

Preferably, the change in the transmission quality may be a change in a physical transmission rate between stations transmitting/receiving data to be scheduled. The transmission schedule constructing section may allocate a time zone having a change rate of the physical transmission rate lower than or equal to a predetermined transmission rate to data not requesting data retransmission.

Thereby, a transmission schedule is constructed in a manner which satisfies a requested retransmission condition using an objective reference.

Preferably, the change in the transmission quality may be a change in a physical transmission rate between stations transmitting/receiving data to be scheduled, the information about the retransmission request may be an upper limit value relating to repetition of retransmission, and the transmission schedule constructing section may allocate a time zone having a change rate of the physical transmission rate lower than or equal to a predetermined transmission rate, when the upper limit value is smaller than or equal to a predetermined value.

Thereby, a transmission schedule is constructed in a manner which satisfies a requested retransmission condition.

A second aspect of the present invention is directed to a method for constructing a transmission schedule for use in time division multiple access of stations on a power line communication network to a power line which is a communication medium. According to this method the transmission schedule is constructed based on a cyclic change in a transmission quality of the communication medium depending on an alternating current power source cycle on the power line and a parameter relating to transmission quality designated in the schedule allocation request.

A third aspect of the present invention is directed to a system constructed on a power line communication network, comprising a control station capable of constructing a transmission schedule for use in time division multiple access to a power line which is a communication medium on a power line communication network, and at least one terminal station of accessing the power line in accordance with the transmission schedule. The control station comprises an allocation request receiving section operable to receive a schedule allocation request within the apparatus and/or a schedule allocation request from the terminal station, and a transmission schedule constructing section operable to construct the transmission schedule based on a cyclic change in a transmission quality of the power line depending on an alternating current power source cycle and a parameter relating to transmission quality designated in the schedule allocation request.

A fourth aspect of the present invention is directed to an integrated circuit capable of constructing a transmission schedule for use in time division multiple access of stations on a power line communication network to a power line which is a communication medium. The circuit comprises an allocation request receiving section operable to receive a schedule allocation request within the apparatus and/or a schedule allocation request from other stations, and a transmission schedule constructing section operable to construct the transmission schedule based on a cyclic change in a transmission quality of the power line depending on an alternating current power source cycle and a parameter relating to transmission quality designated in the schedule allocation request.

According to the present invention, a transmission schedule capable of achieving transmission quality requested by a parameter relating to transmission quality can be constructed, taking into consideration a cyclic change in communication quality depending on an alternating current power source cycle. Therefore, it is possible to provide a method, a system, and an integrated circuit capable of constructing a transmission schedule which allows efficient and stable data transmission.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating a list of data streams for which schedule allocation requests are issued in the first embodiment.

FIG. 8A is a diagram illustrating a result of scheduling when allocation is performed with respect to a data stream 901.

FIG. 8B is a diagram illustrating a result of scheduling when allocation is performed with respect to data streams 902 and 901.

FIG. 11 is a diagram illustrating an average physical transmission rate and an average frame error rate in each slot of FIG. 10 (a slot 1331 to a slot 1335).

FIG. 12 is a diagram illustrating a list of data streams which request allocation in the second embodiment.

FIG. 17 is a diagram illustrating an exemplary medium access method which is discussed in IEEE802.11e.

FIG. 18 is a diagram for explaining a scheduling method of an AP—in a wireless LAN.

FIG. 19 is a diagram for explaining a scheduling method of an AP in a wireless LAN.

DETAILED DESCRIPTION OF THE INVENTION

Hereinafter, embodiments of the present invention will be described with reference to the accompanying drawings.

Figure 1:
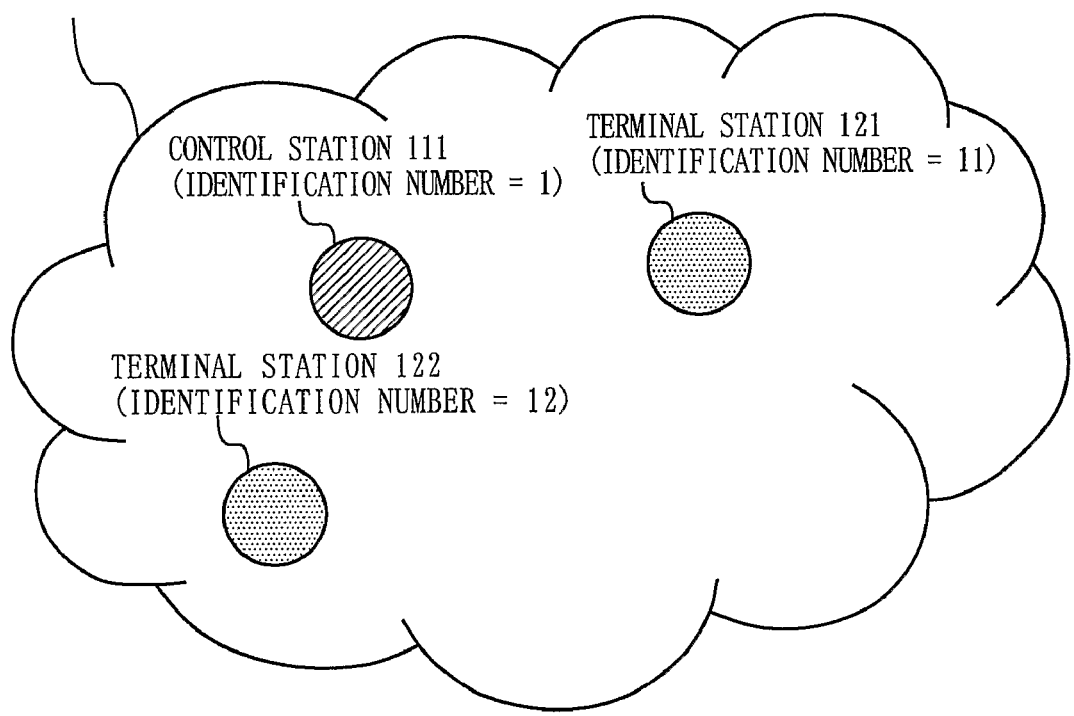
FIG. 1 is a conceptual diagram illustrating a structure of a power line communication network 101 according to an embodiment of the present invention.

FIG. 1 is a conceptual diagram illustrating a structure of a power line communication network 101 according to an embodiment of the present invention. The power line communication network 101 comprises a control station 111 and terminal stations 121 and 122. The control station 111 is a transmission schedule constructing apparatus which constructs a transmission schedule and controls access to the power line communication network 101. The terminal stations 121 and 122 access the power line communication network 101 in accordance with the transmission schedule constructed by the control station 111. Each station has an identification number which can identify the station on the network 101. It is here assumed that the identification number of the control station 111 is "1", the identification number of the terminal station 121 is "11", and the identification number of the terminal station 122 is "12". It is also assumed that the control station 111, the terminal station 121, and the terminal station 122 can communicate with each other on the network 101.

The embodiments of the present invention illustrate an example of scheduling for power line communication which employs a power line of 50 Hz. In the embodiments described below, it is assumed that a transmission schedule determined by the control station 111 is constructed in units of 20 msec which is a cycle (alternating current power source cycle) of a 50-Hz utility power source, and the same pattern is repeated every 20 msec. Note that the unit of the transmission schedule may be an integral multiple of a half cycle of an alternating current power source. Also in this case, the control station 111 can similarly perform scheduling.

First Embodiment

In a first embodiment, the following scheduling policies (1) to (3) are defined. Specifically, (1) the control station 111 performs allocation from the head of an unallocated time without a space, (2) a time for which a physical transmission rate is high is allocated to data which requests a high transmission rate, and (3) when a new allocation request is received, reallocation is performed for all data streams based on the scheduling policies.

Figure 2:
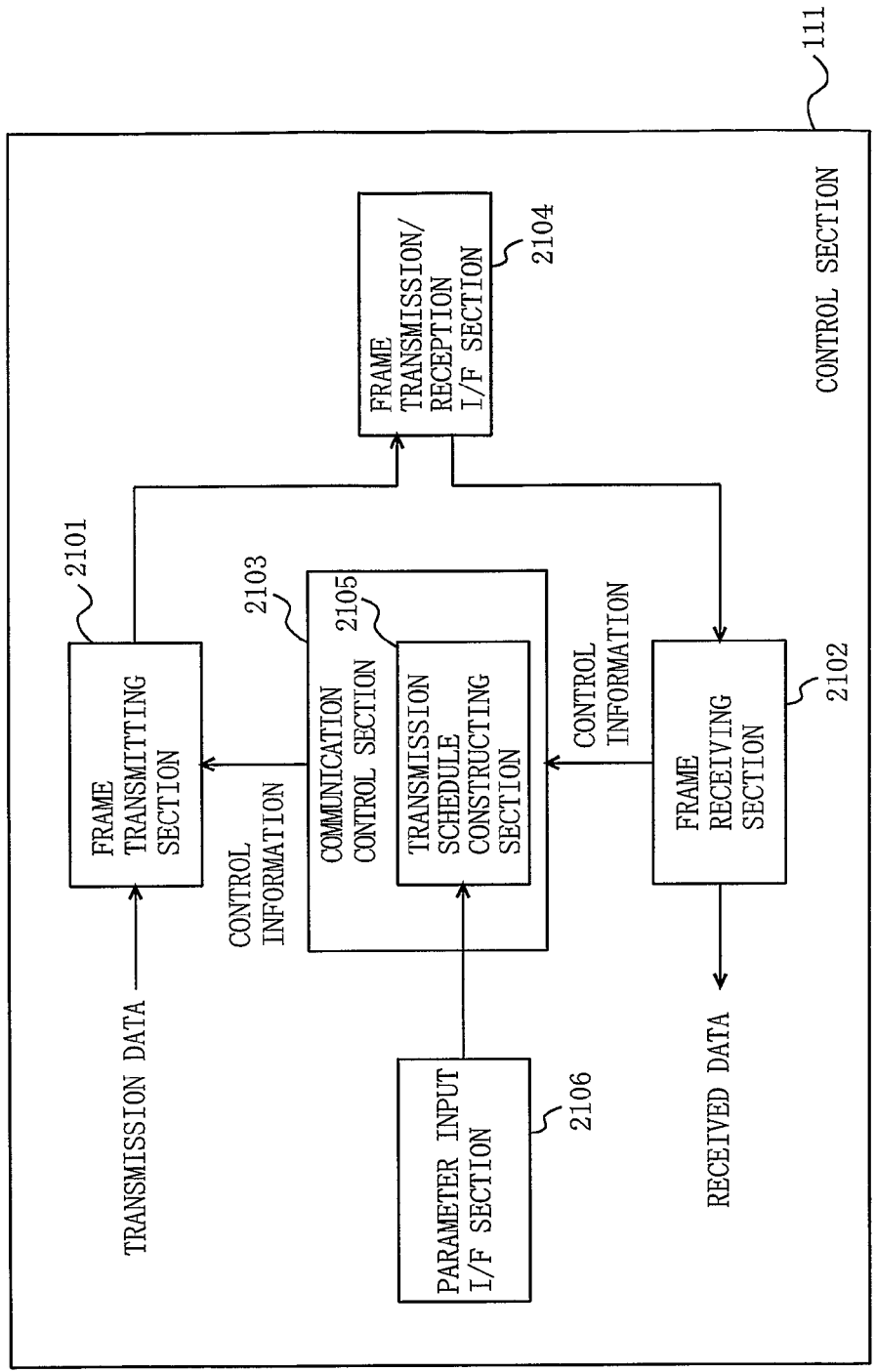
FIG. 2 is a block diagram illustrating a functional structure of a control station 111.

FIG. 2 is a block diagram illustrating a functional structure of the control station 111. In FIG. 2, the control station 111 comprises a frame transmitting section 2101, a frame receiving section 2102, a communication control section 2103, a frame transmission/reception I/F section 2104, and a parameter input I/F section 2106.

The frame receiving section 2102 receives a transmission frame which has been received by the frame transmission/reception I/F section 2104, and performs a required process to determine whether the transmission frame is data, or control information, such as a request for allocation in schedule construction, a physical transmission rate between specific stations, and the like. The frame receiving section 2102 outputs the transmission frame as received data when the transmission frame is data, and transfers the transmission frame to the communication control section 2103 when the transmission frame is control information. In the schedule allocation request, a parameter (QoS parameter) relating to transmission quality is designated. Thus, the frame receiving section 2102 is an allocation request receiving section which can receive a request for allocation in schedule construction (schedule allocation request).

When the control station 111 itself transmits data, a schedule needs to be constructed. The parameter input I/F section 2106 receives a schedule allocation request which is generated in the control station 111. Also in this schedule allocation request, a parameter (QoS parameter) relating to transmission quality is designated. Thus, the parameter input I/F section 2106 is an allocation request receiving section which can receive a schedule allocation request.

The frame transmitting section 2101 divides input transmission data or control information which is generated by the communication control section 2103 into frames, and transfers the frames to the frame transmission/reception I/F section 2104. Thereby, data transmission is performed.

The communication control section 2103 generates control information which is required to control communication, and controls timing of data transmission/reception with reference to information from the frame receiving section 2102. The communication control section 2103 includes a transmission schedule constructing section 2105.

The transmission schedule constructing section 2105 constructs a transmission schedule based on a QoS parameter included in a schedule allocation request received from other stations via the frame receiving section 2102 and a QoS parameter included in a schedule allocation request received by the parameter input I/F section 2106. The transmission schedule constructing section 2105 constructs a transmission schedule in accordance with the above-defined scheduling policies, taking into consideration a cyclic change in a transmission quality of communication medium which depends on an alternating current power source cycle of a power line. When receiving a schedule allocation request from other stations via the frame receiving section 2102, the transmission schedule constructing section 2105 generates control information for informing the station issuing the schedule allocation request of success/failure of schedule construction, and transfers the control information to the frame transmitting section 2101. In response to this, the frame transmitting section 2101 divides the control signal into frames, and transmits the frames to the frame transmission/reception I/F section 2104.

Figure 3:
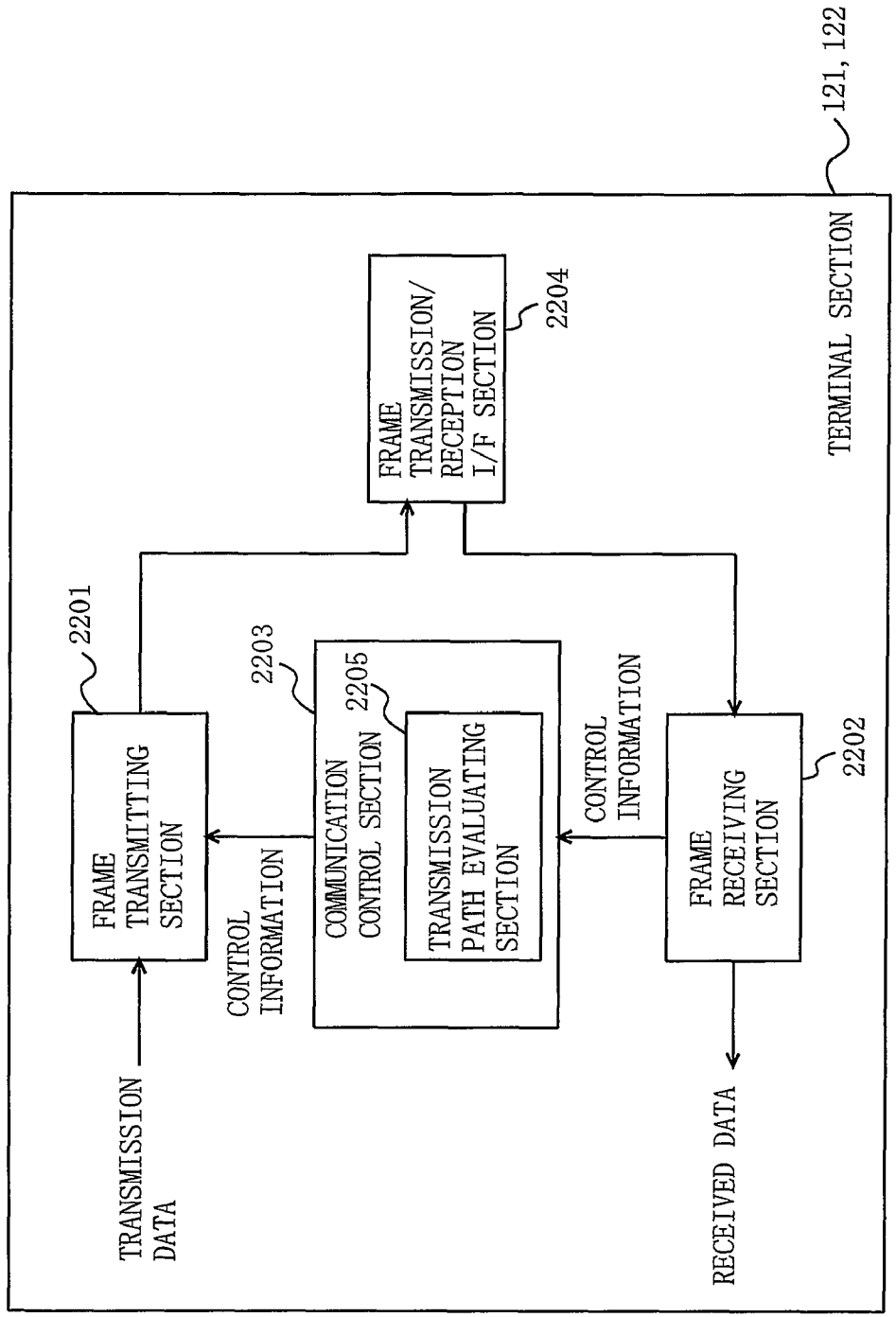
FIG. 3 is a block diagram illustrating a functional structure of terminal stations 121 and 122.

FIG. 3 is a block diagram illustrating a functional structure of the terminal stations 121 and 122. The terminal stations 121 and 122 each comprise a frame transmitting section 2201, a frame receiving section 2202, a communication control section 2203, and a frame transmission/reception I/F section 2204.

The frame receiving section 2202 receives a transmission frame which has been received by the frame transmission/reception I/F section 2204, and performs a required process to determine whether the transmission frame is data or control information. The frame receiving section 2202 outputs the transmission frame as received data when the transmission frame is data, and transfers the transmission frame to the communication control section 2203 when the transmission frame is control information.

The frame transmitting section 2201 divides input transmission data or control information which is generated by the communication control section 2203 into frames, and transfers the frames to the frame transmission/reception I/F section 2204. Thereby, data transmission is performed.

The communication control section 2203 generates control information which is required to control communication, and controls timing of data transmission/reception with reference to information from the frame receiving section 2202. The communication control section 2203 includes a transmission path evaluating section 2205.

The transmission path evaluating section 2205 performs transmission path evaluation using information, such as, for example, a reception signal level or a signal-to-noise ratio which is obtained when the frame transmission/reception I/F section 2204 receives a frame, as a reference. As a result of the transmission path evaluation, the transmission path evaluating section 2205 determines what modulation method can be used, and obtains a physical transmission rate between stations which transmit/receive data and are to be subjected to scheduling. The transmission path evaluating section 2205 inputs the physical transmission rate thus obtained, as control information, to the frame transmitting section 2201, and via the frame transmission/reception I/F section 2204, informs the control station 111 of the physical transmission rate. Note that, when the control section 111 performs data communication, the communication control section 2103 has a transmission path evaluating section having a function equivalent to the transmission path evaluating section 2105 of a terminal station.

Figure 4:
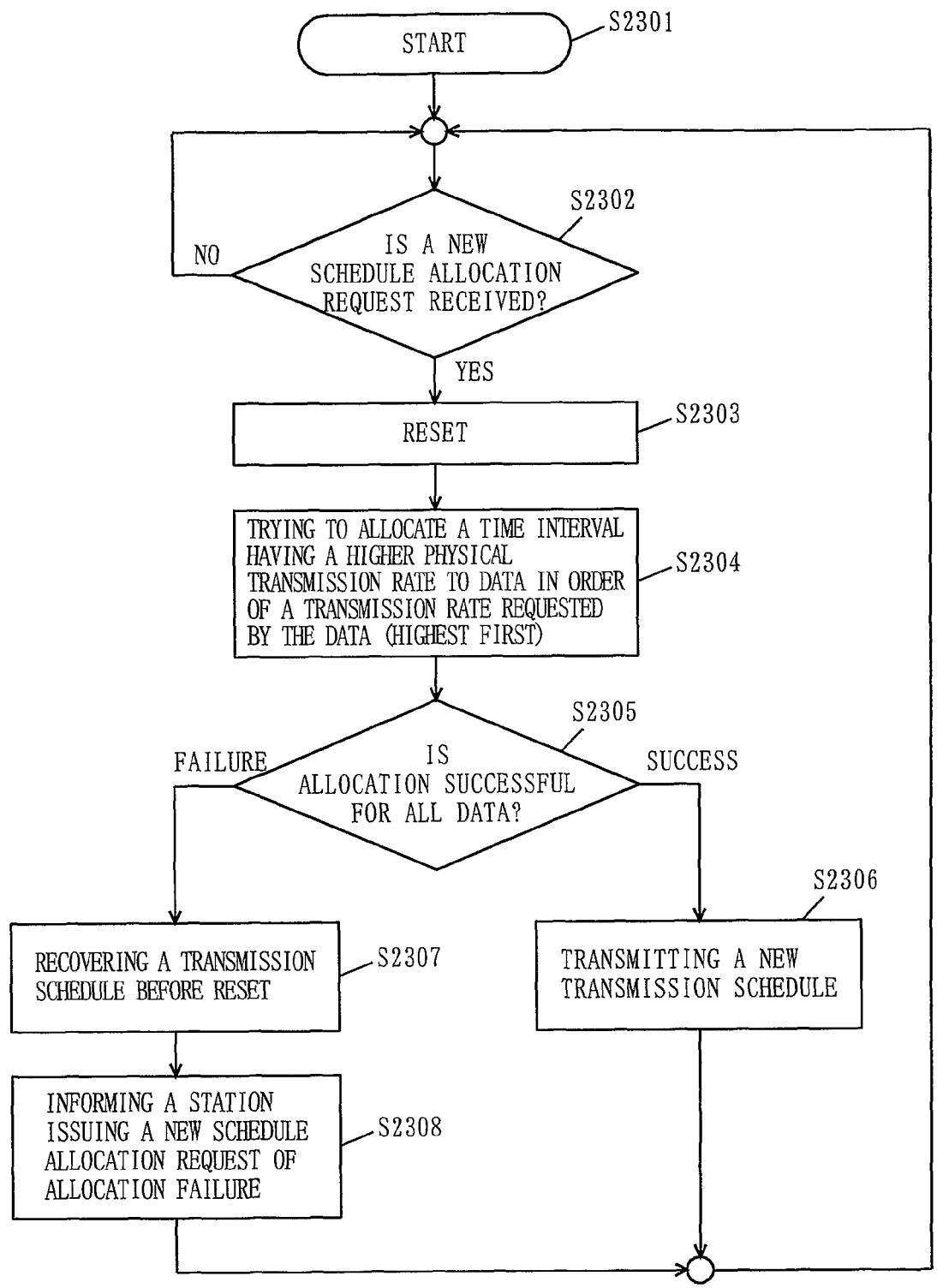
FIG. 4 is a flowchart illustrating an operation of the control station 111.

FIG. 4 is a flowchart illustrating an operation of the control station 111. Hereinafter, the operation of the control station 111 will be described with reference to FIG. 4. When the control station 111 is activated (step S2301), the transmission schedule constructing section 2105 determines whether or not a new schedule allocation request has been received from a terminal station (step S2302). When a new schedule allocation request has not been received from a terminal station, the control station 111 returns to step S2302. On the other hand, when a new schedule allocation request has been received from a terminal station, the transmission schedule constructing section 2105 goes to an operation of step S2303.

In step S2303, the transmission schedule constructing section 2105 resets a transmission schedule which was already constructed. The operation of step S2303 complies with the scheduling policy (3).

Next, the transmission schedule constructing section 2105 tries to allocate a time which has a higher physical transmission rate to data which requires a higher transmission rate in a QoS parameter, among data for which a schedule allocation request was previously issued and data for which a schedule allocation request is newly issued (step S2304). Specifically, the transmission schedule constructing section 2105 allocates a time zone in which a physical transmission rate which is higher than or equal to a predetermined second rate to data which requests a transmission rate which is higher than or equal to a predetermined first rate. On the other hand, the transmission schedule constructing section 2105 allocates a time zone to data which requests a transmission rate which is less than the predetermined first rate, from the head of an unallocated time zone without a space. In other words, the transmission schedule constructing section 2105 can allocate a time zone having a higher physical transmission rate to data to be scheduled which requests a higher transmission rate. The operation of step S2304 complies with the scheduling policies (2) and (1).

Next, the transmission schedule constructing section 2105 determines whether or not time zone allocation is successful to satisfy a QoS parameter requirement with respect to all data for which a schedule allocation request is issued (step S2305).

In step S2305, when allocation is successful with respect to all data, the transmission schedule constructing section 2105 transmits a message that the allocation is successful and transmits a new transmission schedule to the terminal station which has issued the new schedule allocation request and to a terminal station which has issued a previous schedule allocation request (step S2306), and returns to the operation of step S2302.

On the other hand, in step S2305, when it is determined that allocation is not successful with respect to all data, the transmission schedule constructing section 2105 recovers a transmission schedule which was obtained before resetting in step S2303 (step S2307). Next, the transmission schedule constructing section 2105 transmits a frame indicating that the allocation fails to the terminal station which has issued the new schedule allocation request (step S2308), and returns to the operation of step S2302.

In FIG. 4, only processes for schedule construction are described. Actually, the control station 111 may perform transmission/reception of data frames and control frames, and other internal functions, in addition to schedule construction.

As described above, it is assumed that the terminal station 121 or 122 issues a schedule allocation request to the control station 111. Alternatively, the control station 111 may construct a transmission schedule with respect to a schedule allocation request which is generated in the control station 111, using a similar scheduling method. Note that, in this case, the operations of step S2306 and step S2308 in FIG. 4 are omitted.

Figure 5:
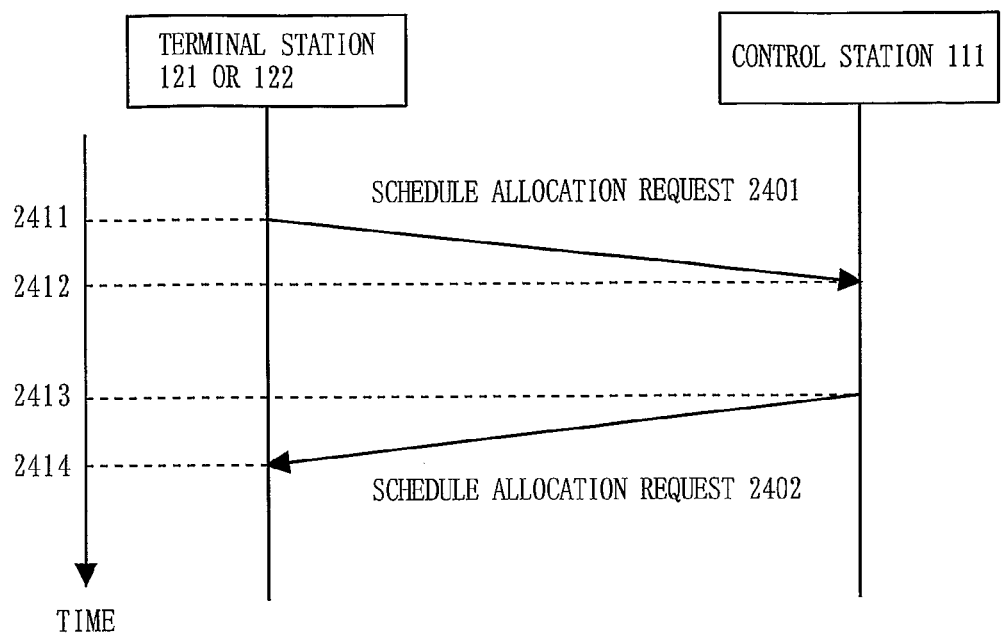
FIG. 5 is a diagram illustrating a general schedule allocation request sequence.

Although the control station 111 is assumed to receive a schedule allocation request from a terminal station in step S2302 of FIG. 4, a schedule allocation request sequence which is performed between the control station 111 and a terminal station is generally as illustrated in FIG. 5. As illustrated in FIG. 5, the terminal station (the terminal station 121 or 122) transmits a schedule allocation request 2401 to the control station 111 at a time 2411. The control station 111 receives the schedule allocation request 2401 at a time 2412, and performs scheduling in accordance with the flowchart of FIG. 4. When the scheduling is successful, the control station 111 returns a schedule allocation request response 2402 indicating transmission permission at a time 2413. On the other hand, when the scheduling fails, the control station 111 returns a schedule allocation request response 2402 indicating transmission refusal at the time 2413. The terminal station receives the schedule allocation request response 2402 at a time 2414 and determines what process is performed with respect to data for which a schedule allocation request is issued, based on the contents of the schedule allocation request response 2402. Although not described in FIG. 5, the schedule allocation request 2401 and the schedule allocation request response 2402 may be accompanied with an acknowledgement frame indicating that the respective frames have been received.

Figure 6:
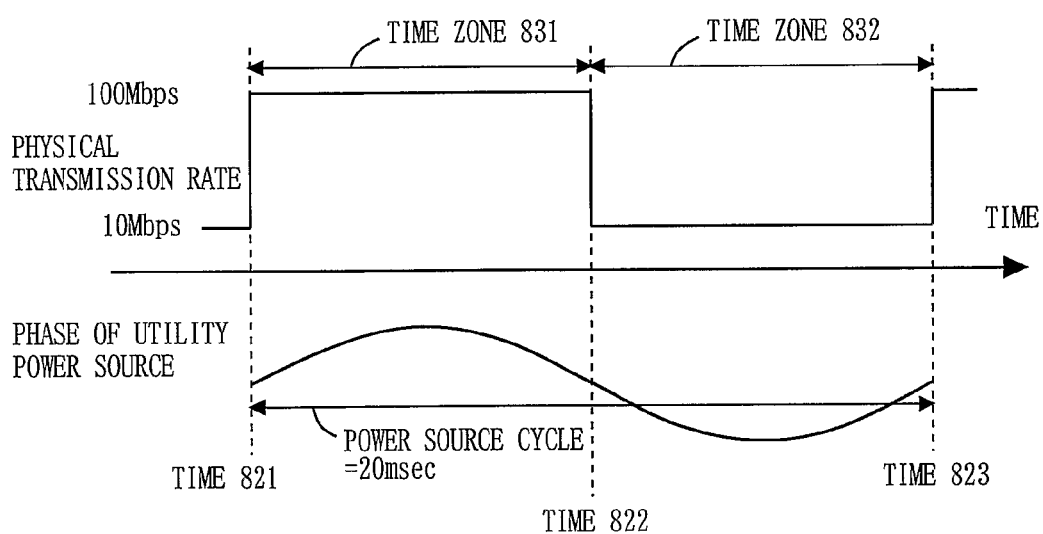
FIG. 6 is a diagram illustrating an exemplary change in transmission quality.

Next, an operation of the transmission schedule constructing section 2105 will be described, specifically illustrating a change in a transmission quality of communication medium. FIG. 6 is a diagram illustrating an exemplary change in a transmission quality state. In the first embodiment, it is assumed that a utility power source has a frequency of 50 Hz. In FIG. 6, as the change in the transmission quality, a change in a physical transmission rate between stations which transmit/receive data to be scheduled to/from each other is used.

In FIG. 6, in a power source cycle from a time 821 to a time 823 (=20 msec), a time of 10 msec (time zone 831) from the cycle starting time 821 to a time 822 (the midpoint of the cycle) has a good medium state. It is assumed that a physical transmission rate of 100 Mbps can be maintained between any terminals in the time zone 831. The remaining half, i.e., a time of 10 msec (time zone 832) from the time 822 to the time 823 has a poor medium state. It is assumed that a physical transmission rate of 10 Mbps can be maintained between any terminals in the time zone 832. Note that an actual change in the medium state is more complicated, and the medium state generally varies among transmission stations and reception stations. For the sake of simplicity, the medium state of FIG. 6 is here assumed. Further, it is here assumed that the first rate is 50 Mbps and the second rate is 100 Mbps.

FIG. 7 is a diagram illustrating a list of data streams for which schedule allocation requests are issued in the first embodiment. In FIG. 7, the data streams for which schedule allocation requests are issued are a data stream 901 which requests a transmission rate of 5 Mbps as a QoS parameter and a data stream 902 which requests a transmission rate of 50 Mbps. It is assumed that schedule allocation requests are transmitted to the control station 111 in order of the data streams 901 and 902. Note that, for the sake of simplicity of calculation, the transmission rate of each data stream is calculated by converting a data rate in an application to a physical transmission rate. The transmission schedule constructing section 2105 performs scheduling with respect to transmission of the two data streams 901 and 902 through a power line communication medium having the change in the transmission quality of FIG. 6.

When receiving an allocation request of the data stream 901, the transmission schedule constructing section 2105 allocates a required time to the data stream 901 from the scheduling cycle starting time 821 in accordance with the scheduling policy (1) since the requested rate (5 Mbps) is lower than the first rate (50 Mbps) (see step S2304 of FIG. 4). The power source cycle is 20 msec, the medium rate in the time zone 831, in which the allocated time is included, is 100 Mbps, the physical transmission rate requested by the data stream 901 is 5 Mbps, and 20×(5/100)=1 msec. Therefore, a time which should be allocated to the data stream 901 is from the scheduling cycle starting time 821 to a time 1121 which is 1 msec after the time 821. FIG. 8A is a diagram illustrating a result of scheduling when the allocation is performed with respect to the data stream 901.

Next, the control station 111 is assumed to receive an allocation request of the data stream 902. The transmission schedule constructing section 2105 resets a current transmission schedule in accordance with the scheduling policy (3) (see step S2303 of FIG. 4), and performs rescheduling with respect to the data streams 901 and 902. Since the data stream 902 requests a rate (50 Mbps) which is higher than or equal to the first rate, the transmission schedule constructing section 2105 allocates the time zone 831 which can provide a physical transmission rate which is higher than or equal to the second rate (100 Mbps) to the data stream 902 in accordance with the scheduling policy (2) (see step S2304 of FIG. 4). The transmission schedule constructing section 2105 allocates the time zone 832 having a low medium rate to the data stream 901 requesting a low physical transmission rate (see step S2304 of FIG. 4). The power source cycle is 20 msec, the medium rate of the time zone 831 is 100 Mbps, the physical transmission rate requested by the data stream 902 is 50 Mbps, and 20×(50/100)=10 msec. Therefore, the transmission schedule constructing section 2105 allocates the entire time zone 831 to the data stream 902. The power source cycle is 20 msec, the medium rate of the time zone 832 is 10 Mbps, the physical transmission rate requested by the data stream 901 is 5 Mbps, and 20×(5/10)=10 msec. Therefore, the transmission schedule constructing section 2105 allocates the entire time zone 832 to the data stream 901. FIG. 8B is a diagram illustrating a result of scheduling when the allocation is performed with respect to the data streams 902 and 901. Thus, in the first embodiment, a transmission schedule is constructed based on a cyclic change in transmission quality depending on an alternating current power source cycle and a QoS parameter designated in a scheduling allocation request, so that the resultant schedule satisfies each QoS parameter requirement.

Hereinafter, in order to describe an effect of the present invention, the case where the scheduling policy (2) in the first embodiment, i.e., "a time having a higher physical transmission rate is allocated to data requesting a higher transmission rate" is not used will be considered.

When receiving the allocation request of the data stream 901, a control station performs allocation based on the scheduling policy (1) as illustrated in FIG. 8A. Next, the control station which has received the allocation request of the data stream 902 resets a transmission schedule based on the scheduling policy (3). However, in this case, since the scheduling policy (2) is not defined, the order of priority of scheduling is not defined. Therefore, it is indeterminate whether the data stream 901 or the data stream 902 is subjected first to scheduling. It is here assumed that scheduling is performed in order of the data stream 901 and the data stream 902.

The control station performs allocation with respect to the data stream 901 to construct a schedule of FIG. 8A. Thereafter, the control station tries to perform allocation with respect to the data stream 902. In accordance with the scheduling policy (1), i.e., "allocation is performed from the head of an unallocated time without a space", the control station tries to allocate a time immediately after the time 1121 to the data stream 902. The power source cycle is 20 msec, a time immediately after the time 1121 is in the time zone 831, in which the medium rate is 100 Mbps, the physical transmission rate requested by the data stream 902 is 50 Mbps, and a time required for allocation is 20×(50/100)=10 msec. In contrast, the unallocated time in the time zone 831 is 9 msec which is obtained by subtracting 1 msec which is allocated to the data stream 901 from the entire time zone 831 (10 msec). Therefore, 10 msec cannot be allocated to the data stream 902.

Next, the case where the time zone 832 is allocated to the data stream 902 will be considered. However, the time zone 832 has a medium rate of 10 Mbps, and therefore, it is not possible to allocate the time zone 832 to the data stream 902, which requires a physical transmission rate of 50 Mbps.

Thus, the control station cannot allocate the time zone 831 or the time zone 832 to the data stream 902.

In this case, if the remaining time of the time zone 831 and the entire time zone 832 are used, it is mathematically possible to allocate a time zone to the data stream 902. Specifically, if the unallocated time of 9 msec in the time zone 831 is allocated to the data stream 902, such a time zone is allocated to 90% of the data amount of the data stream 902. When the time zone 832 is allocated to the remaining 10%, a time required for allocation is 20×(50/10)×0.1=10 msec. Therefore, it is mathematically possible to perform scheduling with respect to the data stream 902 using the remaining time of the time zone 831 and the time zone 832. Actually, since transmission quality significantly changes at the time 822, so that a transmission error occurs, there is a high possibility that a reception station cannot normally receive the signal.

Figure 9:
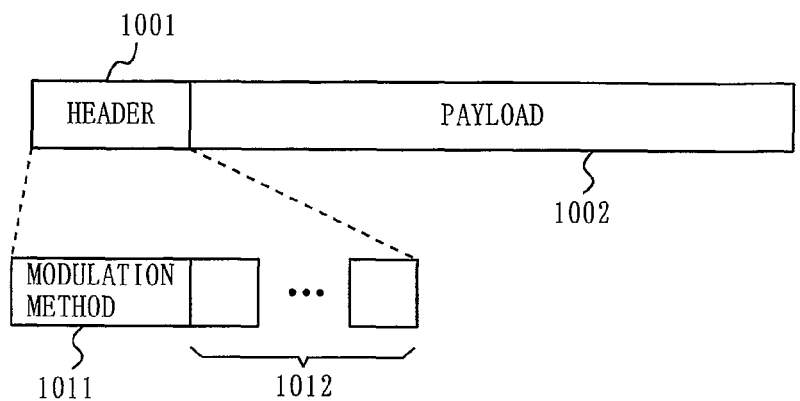
FIG. 9 is a diagram illustrating a general frame structure.

Alternatively, it may be considered that the control station divides the data stream 902 into frames to which the time zone 831 and the time zone 832 are separately allocated. Actually, data is divided into a header 1001 and a payload 1002 as illustrated in FIG. 9. The header 1001 is a portion which is always modulated using the same modulation method, and is composed of a subfield 1011 indicating a modulation method for the payload 1002 and a subfield group 1012 including 0 or more subfields including other information. The payload 1002 is a field for transmitting data of an upper layer, and is modulated using the modulation method described in the subfield 1011. A frame transmission station describes the modulation method for the payload 1002 into the modulation method subfield 1011. A frame reception station demodulates the payload 1002 based on the subfield 1011 of the received frame. Thus, the frame has the header 1001 which is an overhead. Therefore, if data is divided and transmitted in a plurality of frames, the over head is increased by the headers though the amount of the data is the same. Therefore, a time required for allocation is increased. Thus, in the first embodiment, it is not possible to divide the data stream 902 into separate frames and allocate the time zone 831 and the time zone 832 to the frames.

As described above, according to the first embodiment, the control station 111 can construct a transmission schedule so that a transmission rate designated in a schedule allocation request is satisfied, taking into consideration a cyclic change in a transmission quality of communication medium depending on an alternating current power source cycle. Therefore, the control station 111 functions as a transmission schedule constructing apparatus capable of providing a schedule which can allow efficient and stable data transmission.

Note that a station which functions as a transmission schedule constructing apparatus in addition to a control station, may be provided.

Note that, in the foregoing description, to facilitate understanding of the present invention, the alternating current power source cycle is divided into two, and a change in a transmission quality is represented by two physical transmission rates. The present invention is not limited to this. Alternatively, in the present invention, a change in a transmission quality is preferably defined as follows. In the present invention, preferably, a cycle of an alternating current power source or an integral multiple of a half cycle of an alternating current power source is divided into a plurality of time intervals, and a change in an estimated average physical transmission rate of each time interval is obtained as the change in the transmission quality.

Second Embodiment

In a second embodiment, the control station 111 is operated in accordance with the following scheduling policies. The scheduling policies of the second embodiment are (1) allocation is performed from the head of an unallocated time without a space, (2) a time which is a double of a requested transmission rate is allocated in order to achieve retransmission of a frame due to transmission error, (3) a slot in which a medium state is stable is allocated to a data stream for which a requested transmission delay is smaller than or equal to a scheduling cycle, and (4) when a new allocation request is received, reallocation is performed for all data streams based on the scheduling policies.

In the second embodiment, the apparatus structure and operational flow of the control station 111 are similar to those of the first embodiment and will be described with reference to FIG. 2 and FIG. 4. Note that, in step S2304 of FIG. 4, the transmission schedule constructing section 2105 is assumed to allocate a time slot having a stable medium state (a time slot having a change rate of a physical transmission rate which is lower than or equal to a predetermined change rate) to a data stream requesting a transmission delay which is smaller than or equal to a scheduling cycle in accordance with the scheduling policy (3). The transmission schedule constructing section 2105 is also assumed to allocate a time which is a double of a requested transmission rate from the head of an unallocated time without a space, in accordance with the scheduling policies (2) and (1).

The apparatus structure of the terminal stations 121 and 122 is assumed to be similar to that of FIG. 3.

Figure 10:
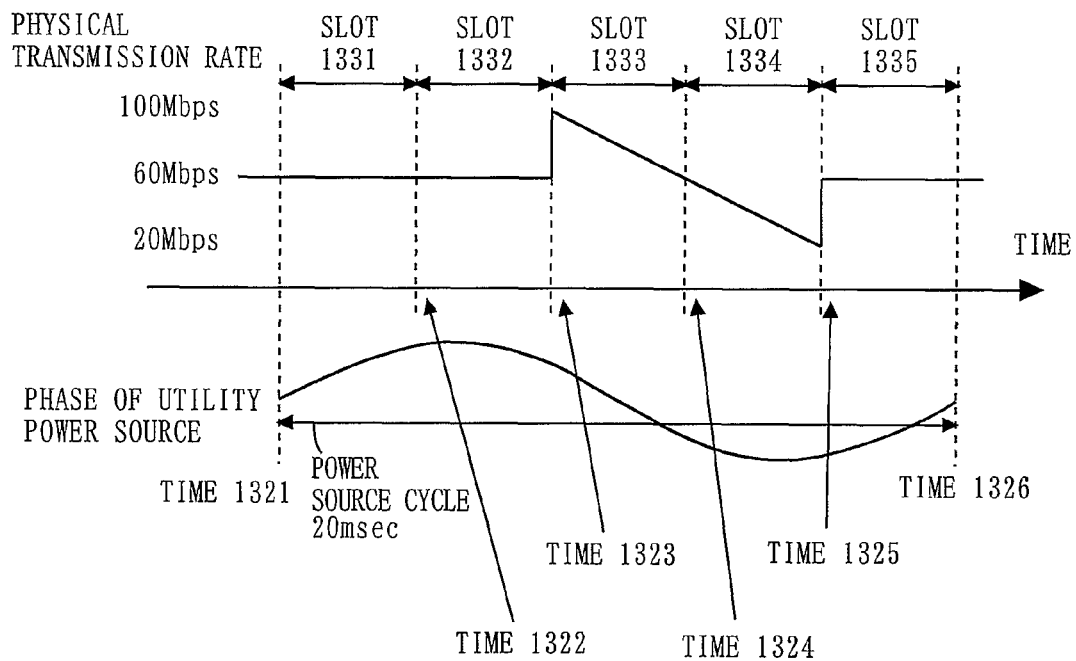
FIG. 10 is a diagram for explaining scheduling in a second embodiment.

FIG. 10 is a diagram for explaining scheduling in the second embodiment. As illustrated in FIG. 10, the control station 111 manages a plurality of time intervals (slots) which are obtained by dividing a scheduling cycle, which is equal to a power source cycle, into units of 4 msec, for the purpose of scheduling. The control station 111 divides the scheduling cycle into: a slot 1331 which is a time from the head of the scheduling cycle (time 1321) to a time 1322 which is 4 msec after the time 1321; a slot 1332 from the time 1322 to a time 1323 which is 4 msec after the time 1322; a slot 1333 from the time 1323 to a time 1324 which is 4 msec after the time 1323; a slot 1334 from the time 1324 to a time 1325 which is 4 msec after the time 1324; and a slot 1335 from the time 1325 to a time 1326 which is 4 msec after the time 1325.

A change in a transmission quality is assumed to be such that an estimated average physical transmission rate which can be provided at the same time between each terminal can be secured as in the first embodiment.

A specific example will be hereinafter described. A physical transmission rate of 60 Mbps is maintained from the time 1321 to the time 1323, i.e., the slot 1331 and the slot 1332, in the power source cycle (=20 msec) from the time 1321 to the time 1326. Thereafter, at the time 1323, the transmission quality is instantaneously changed to a state that a physical transmission rate of 100 Mbps can be achieved. However, the physical transmission rate linearly decreases to 20 Mbps from the time 1323 to the time 1325 (8 msec). At the time 1325, the physical transmission rate is instantaneously restored to 60 Mbps. The physical transmission rate is maintained to be 60 Mbps from time 1325 until the time 1326, i.e., in the slot 1335. The above-described change is applied to communication between each terminal.

FIG. 11 is a diagram illustrating an average physical transmission rate and an average frame error rate in each slot of FIG. 10 (the slot 1331 to the slot 1335). In the second embodiment, the transmission schedule constructing section 2105 is assumed to perform scheduling using the average physical transmission rates in the slots as references.

FIG. 12 is a diagram illustrating a list of data streams which request allocation in the second embodiment. In each data stream requesting allocation, requirements relating to a transmission rate and a maximum delay are set as QoS parameters. A first data stream 1501 requests a transmission rate of 12 Mbps and a maximum transmission delay of 200 msec. A second data stream 1502 requests a transmission rate of 12 Mbps and a maximum transmission delay of 5 msec. The transmission schedule constructing section 2105 constructs a transmission schedule so that these two data streams transmitted on a power line communication medium having a medium change of FIG. 10 satisfy requests for transmission delay times.

Note that, in the second embodiment, for the sake of simplicity, the frame structure of FIG. 9 is not taken into consideration. Specifically, calculation is performed without taking into consideration that the overhead due to the header 1001 is increased with an increase in the number of transmitted frames.

Figure 13A:
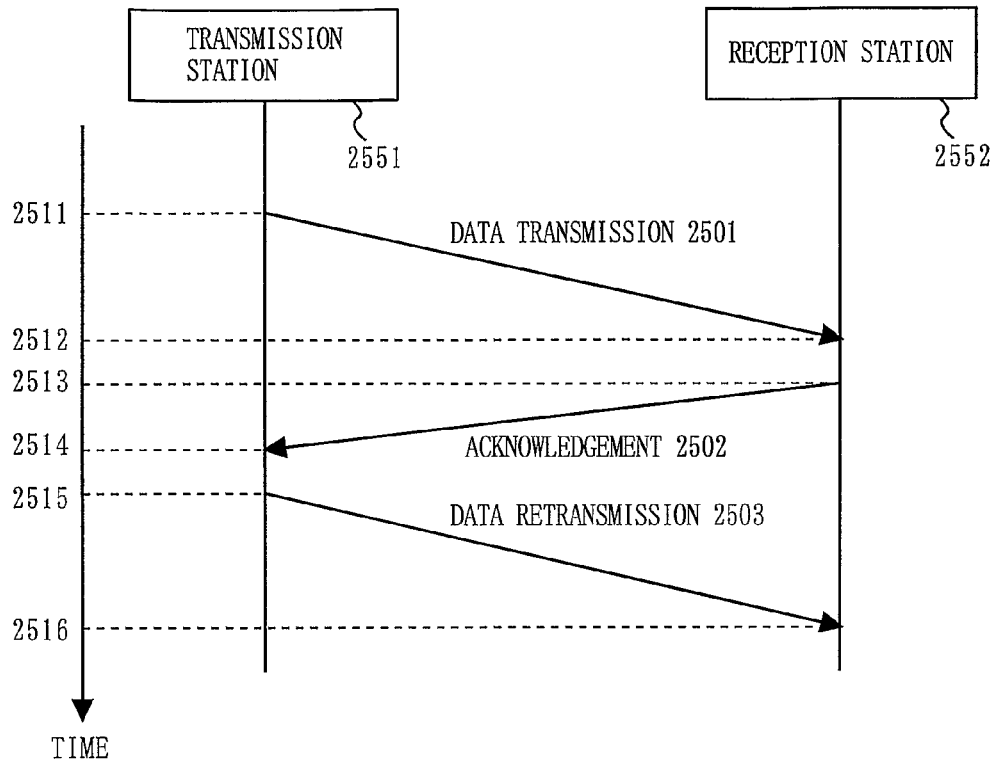
FIG. 13A is a diagram illustrating a general sequence from transmission to retransmission of a data frame.

Also in the second embodiment, a sequence from transmission to retransmission of a data frame is simplified. FIG. 13A is a diagram illustrating a general sequence from transmission to retransmission of a data frame. As illustrated in FIG. 13A, generally, a transmission station 2551 performs transmission 2501 of a data frame at a time 2511. The transmission is completed at a time 2512. After the completion of the transmission, a reception station 2552 starts a reception process, and at a time 2513, transmits an acknowledgement 2502 of the data frame to the transmission station 2551. When confirming that the data frame has not been normally received in the reception process due to an influence, such as transmission error or the like, the reception station 2552 causes the acknowledgement 2502 to contain such an abnormality. After receiving the acknowledgement 2502 at a time 2514, the transmission station 2551 performs retransmission 2503 of the data frame from a time 2515 to a time 2516 as required. Thus, in addition to a time required for actual data transmission (i.e., a time from the time 2511 to the time 2512) and a time required for data retransmission (i.e., a time from the time 2515 to the time 2516), a time (from the time 2512 to the time 2515 in FIG. 13A) is required for a reception process by transmission and reception stations, transmission of the acknowledgement 2502 from the reception station 2552 to the transmission station 2551, and the like.

Figure 13B:
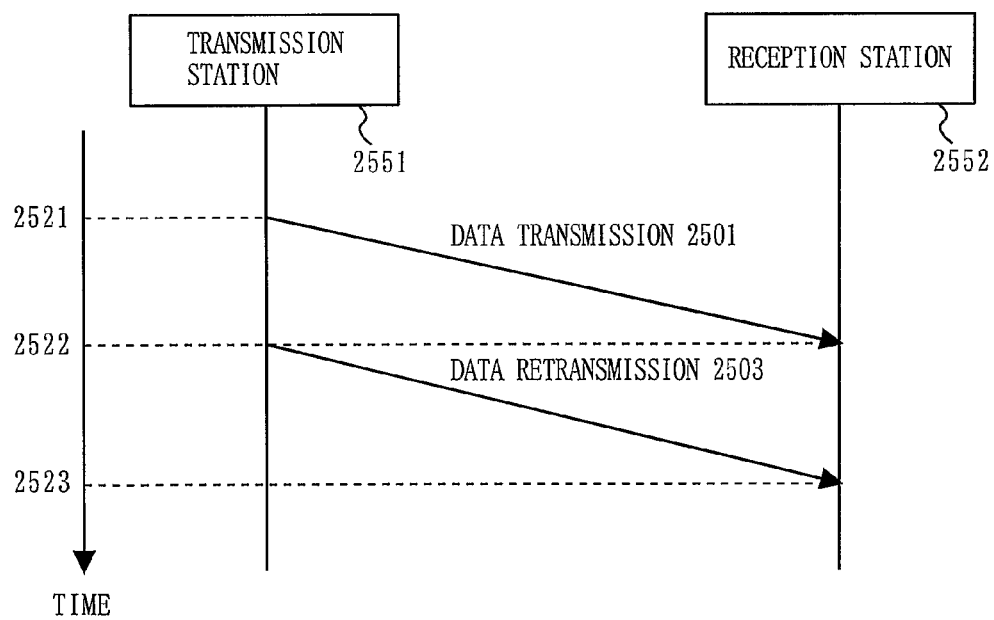
FIG. 13B is a diagram illustrating a sequence from transmission to retransmission of a data frame, which is used in the second embodiment.

FIG. 13B is a diagram illustrating a sequence from transmission to retransmission of a data frame, which is used in the second embodiment. In the second embodiment, as illustrated in FIG. 13B, a simplified sequence is used. Specifically, the transmission station 2551 performs data transmission 2501 from a time 2521 to a time 2522, and following to this, performs retransmission 2503 of the previously transmitted data from a time 2522 to a time 2523.

Next, a flow of scheduling in the second embodiment will be described using the data stream of FIG. 12. When receiving an allocation request of a data stream 1501, the transmission schedule constructing section 2105 allocates a required time to the data stream 1501 from a scheduling cycle starting time 1321 in accordance with the scheduling policy (1). The data stream 1501 requests a transmission rate of 12 Mbps. If the slot 1331 having a physical transmission rate five times higher than 12 Mbps is repeatedly used every power source cycle, ⅕ of the entire time can be used. Therefore, in the slot 1331, the data stream 1501 requesting a physical transmission rate of exact 12 Mbps can be transmitted. In addition, since the scheduling policy (2) defines that the same amount of time is allocated to retransmission, the transmission schedule constructing section 2105 eventually allocates the slot 1331 and the slot 1332.

Thereafter, the control station 111 which has received an allocation request of a data stream 1502 resets a current transmission schedule in accordance with the scheduling policy (4) (corresponding to step S2302 of FIG. 4), and performs rescheduling with respect to the data streams 1501 and 1502.

According to the scheduling policy (3), a slot having a stable medium state (a change rate of a physical transmission rate is lower than or equal to a predetermined change rate) is supposed to be allocated to the data stream 1502 whose delay requirement is smaller than a scheduling cycle of 20 msec. Therefore, the transmission schedule constructing section 2105 tries to use the slots 1331, 1332, and 1335 which can provide a stable physical transmission rate, but not the slot 1333 and 1334 which have a changing physical transmission rate (corresponding to step S2304 of FIG. 4). A physical transmission rate required by the data stream 1502 is 12 Mbps according to FIG. 12. Therefore, the transmission schedule constructing section 2105 uses all of the slot 1331 and the slot 1332 as in the case where scheduling is performed with respect to the data stream 1501, thereby completing allocation with respect to the data stream 1502.

Next, the transmission schedule constructing section 2105 allocates a slot(s) to the data stream 1501. The delay requirement of the data stream 1501 is 200 msec at maximum, which is larger than the scheduling cycle of 20 msec. Therefore, the transmission schedule constructing section 2105 tries to perform scheduling from the slot 1333 to the slot 1335 from the head without a space, without taking the stability of a medium state, in accordance with the scheduling policies (1) and (3) (corresponding to step S2304 of FIG. 4). Since the slot 1333 has an average physical transmission rate of 80 Mbps, the slot 1333 has a physical transmission rate 80/12 (=20/3) times higher than a physical transmission rate of 12 Mbps requested by the data stream 1502. Therefore, if the transmission schedule constructing section 2105 performs scheduling so that the data stream 1501 occupies the slot 1333 every scheduling cycle, since the slot 1333 occupies ⅕ of the entire time, the data stream 1502 can be transmitted, and in addition, ⅓ of a time required for retransmission can be secured. However, the scheduling policy (2) cannot be satisfied by only the slot 1333, and therefore, the transmission schedule constructing section 2105 tries to allocate the following slot 1334 to the data stream 1502. According to FIG. 11, the slot 1334 has an average physical transmission rate of 40 Mbps. Therefore, the slot 1334 has a physical transmission rate 40/12 (=10/3) times higher than the physical transmission rate of 12 Mbps requested by the data stream 1502. Therefore, if the transmission schedule constructing section 2105 performs scheduling so that the slot 1334 is occupied every scheduling cycle, since the slot 1334 occupies of ⅕ of the entire time, ⅔ of a time required for transmission of the data stream 1502 can be secured. If the transmission schedule constructing section 2105 performs scheduling so that the slot 1334 is allocated to retransmission, the slot 1334 and the previously allocated slot 1333 can complete scheduling of the data stream 1502.

As described above, according to the second embodiment, the transmission schedule constructing section 2105 can construct a transmission schedule which satisfies requirements for a transmission rate and a tolerable transmission delay time.

In the foregoing description, it is assumed that a slot in which a medium state is stable is allocated to a data stream for which "a requested transmission delay is smaller than or equal to a scheduling cycle". However, the threshold is not limited to the scheduling cycle. Other values obtained using the scheduling cycle as a reference may be employed, or alternatively, values which are not related to the scheduling cycle may be employed. In other words, the transmission schedule constructing section 2105 may perform scheduling so that a time zone having a change rate of a physical transmission rate which is lower than or equal to a predetermined change rate to data requesting a transmission delay time which is lower than or equal to a predetermined transmission delay time. In FIG. 10, the predetermined change rate is "0" in the slots 1331 and 1332.

The transmission schedule constructing section 2105 may not use an absolute value as the threshold, and may relatively allocate a slot having a stable medium state to data streams in order of the value of a time given as a maximum delay requirement (smallest first). In other words, the transmission schedule constructing section 2105 may operate to allocate a time zone having a lower change rate of a physical transmission rate to data to be scheduled which requests a smaller transmission delay time.

In addition, the transmission schedule constructing section 2105 may allocate a slot having a higher average physical transmission rate to data which requests a smaller transmission delay time.

A probability that a data frame which is transmitted as the data stream 1502 does not satisfy the maximum delay requirement is calculated. In the case of transmission of an AV stream, there is a limit on the amount of a reception buffer of an AV apparatus. Therefore, when the amount of data accumulated in the reception buffer exceeds the limit, a delay occurs, leading to a frame drop or the like. In the case of IP telephone using VoIP, it is considerably important to satisfy the delay requirement in order to achieve bidirectional audio communication without a sense of discomfort.

The control station 111 allocates a time which is a double of a time required for data transmission to the data in accordance with the scheduling policy (2), so that a data frame transmitted in the slot 1331 is retransmitted in the following slot 1332. The delay time requirement of the data stream 1502 has an upper limit of 5 msec. Therefore, even when data transmitted in the slot 1331 could not be normally received by a reception station, the delay is 4 msec if transmission is successful in the following slot 1332, and therefore, the delay requirement of the data stream 1502 is satisfied. However, if the retransmission in the slot 1332 also fails, the data frame of the data stream 1502 is transmitted in the next scheduling cycle, so that the delay requirement is not satisfied. Therefore, a probability that each data frame transmitted as the data stream 1502 does not satisfy the maximum delay requirement is calculated. The probability is equal to a probability that transmission/reception is not completed until the first retransmission. Since the slot 1331 and the slot 1332 both have a frame error rate of 0.01%, a probability that two or more-time retransmission is required is 0.000001% (=1−0.9999−0.0001×0.9999=0.00000001). This means that, when it is assumed that one data frame is transmitted every 20 msec, one frame does not satisfy the delay requirement every 555.5 hours. This value is sufficiently small for the purpose of viewing an AV stream or the like.

Next, it is assumed that the scheduling policy (3) in the second embodiment, i.e., "a slot in which a medium state is stable is allocated to a data stream for which a requested transmission delay is smaller than or equal to a scheduling cycle", is not defined. In this case, the control station performs scheduling with respect to an allocation request of the data stream 1501 as in the second embodiment, and following to this, when receiving an allocation request of the data stream 1502, performs an operation different from that of the second embodiment. Specifically, the control station tries to perform scheduling so that the data stream 1502 is placed immediately after the data stream 1501. Since the data stream 1501 and the data stream 1502 require the same physical transmission rate, the control station completes scheduling by allocating the slot 1333 and the slot 1334 to the data stream 1502.

Also in this case, a probability that each data frame transmitted as the data stream 1502 does not satisfy the maximum delay requirement is calculated. A condition required for a data frame belonging to the data stream 1502 to satisfy the maximum delay requirement is that the number of times of retransmission is one or less. Therefore, since the slot 1333 and the slot 1334 both have a frame error rate of 1%, a probability that retransmission occurs two or more times is 0.01% (=1−0.99−0.01×0.99=0.0001). This means that, when it is assumed that, when one data frame is transmitted every 20 msec, one frame does not satisfy the delay requirement every 200 seconds. This value does not provide quality acceptable for the purpose of viewing an AV stream or the like.

Therefore, as in the second embodiment, when a data stream has a requested transmission delay time which is smaller than the scheduling cycle, by allocating a time zone having a change rate of a physical transmission rate which is lower than or equal to a predetermined change rate, it is possible to perform scheduling which achieves high-quality data transmission.

Third Embodiment

In a third embodiment, the control station 111 is operated in accordance with the following scheduling policies. The scheduling policies of the third embodiment are (1) allocation is performed from the head of an unallocated time without a space, (2) a time which is a double of a requested transmission rate is allocated in order to achieve retransmission of a frame due to transmission error, (3) a slot in which a medium state is stable is allocated to a data stream which is not transmitted, and (4) when a new allocation request is received, reallocation is performed for all data streams based on the scheduling policies.

In the third embodiment, the apparatus structure and operational flow of the control station 111 are similar to those of the first embodiment and will be described with reference to FIG. 2 and FIG. 4. Note that, in step S2304 of FIG. 4, the transmission schedule constructing section 2105 is assumed to allocate a time slot having a stable medium state (a time slot having a change rate of a physical transmission rate which is lower than or equal to a predetermined change rate) to a data stream which is not retransmitted, in accordance with the above-described scheduling policies. The transmission schedule constructing section 2105 is also assumed to allocate a time which is a double of a requested transmission rate to a data stream which is retransmitted, from the head of an unallocated time without a space, in accordance with the scheduling policies (2) and (1).

The apparatus structure of the terminal stations 121 and 122 is assumed to be similar to that of FIG. 3.

In the third embodiment, a manner of dividing a power source cycle into slots, a change in a transmission quality of communication medium, and an average physical transmission rate and a frame error rate in each slot, are assumed to be similar to those of the second embodiment. FIG. 10 and FIG. 11 will be referenced.

Figures 14, 15, 16:
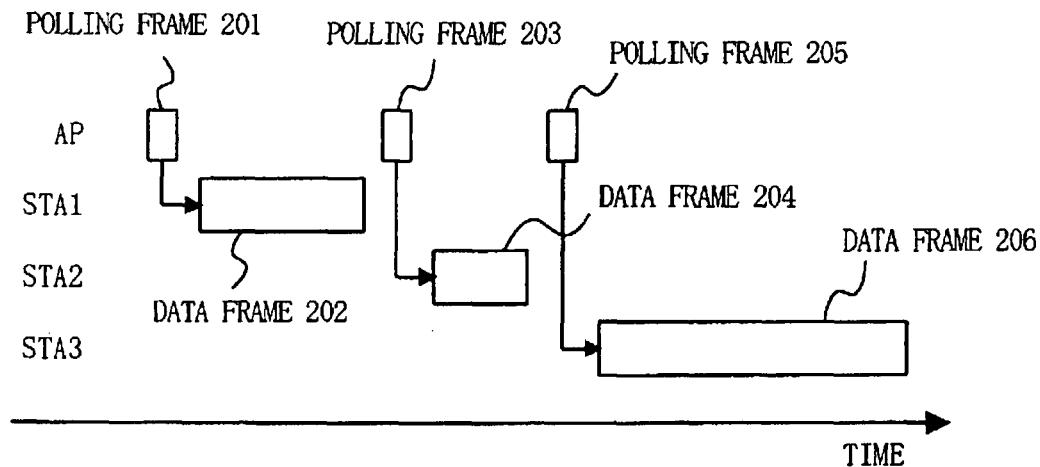
FIG. 14 is a diagram illustrating an exemplary data stream to be scheduled in a third embodiment.
FIG. 15 is a diagram illustrating an example of PCF medium access.
FIG. 16 is a diagram illustrating a portion of a list of TSPECs.
Figure 20A:
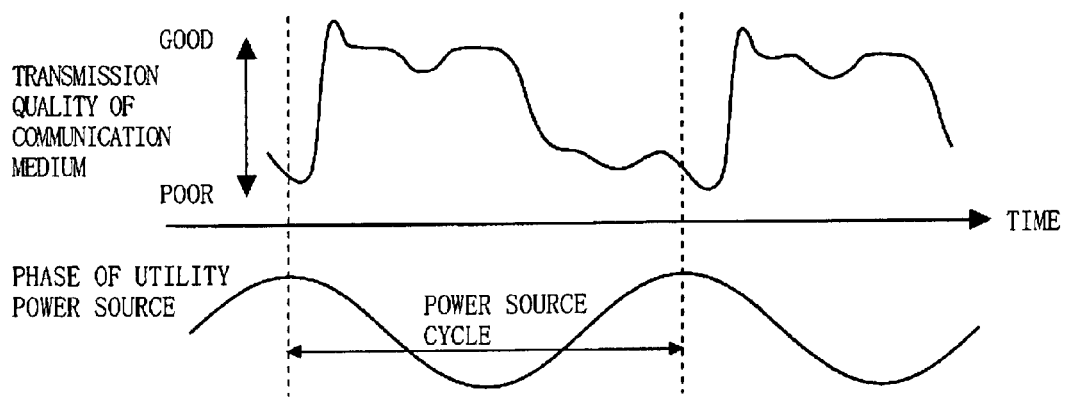
FIG. 20A is a diagram illustrating how transmission quality changes in synchronization with a utility alternating current power source cycle.
Figure 20B:
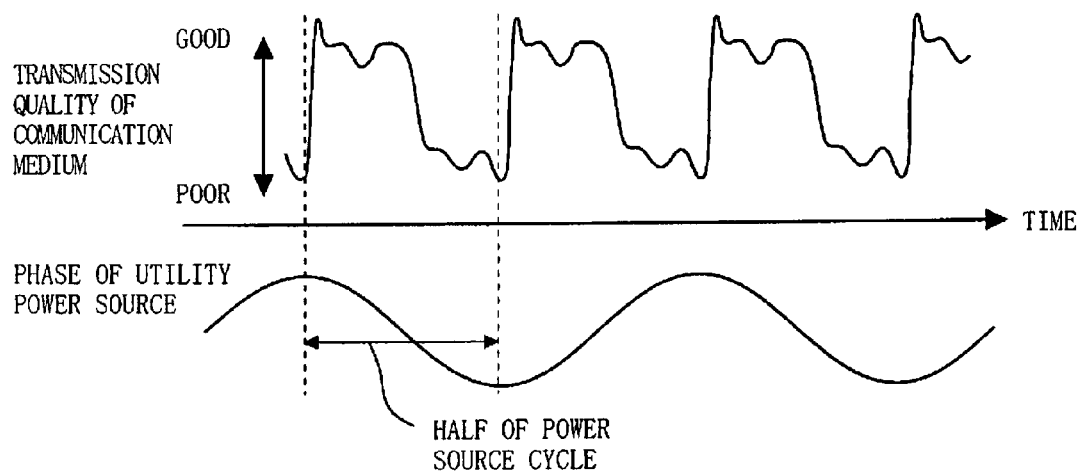
FIG. 20B is a diagram illustrating how transmission quality changes in synchronization with a half cycle of a utility alternating current power source.
Figure 20C:
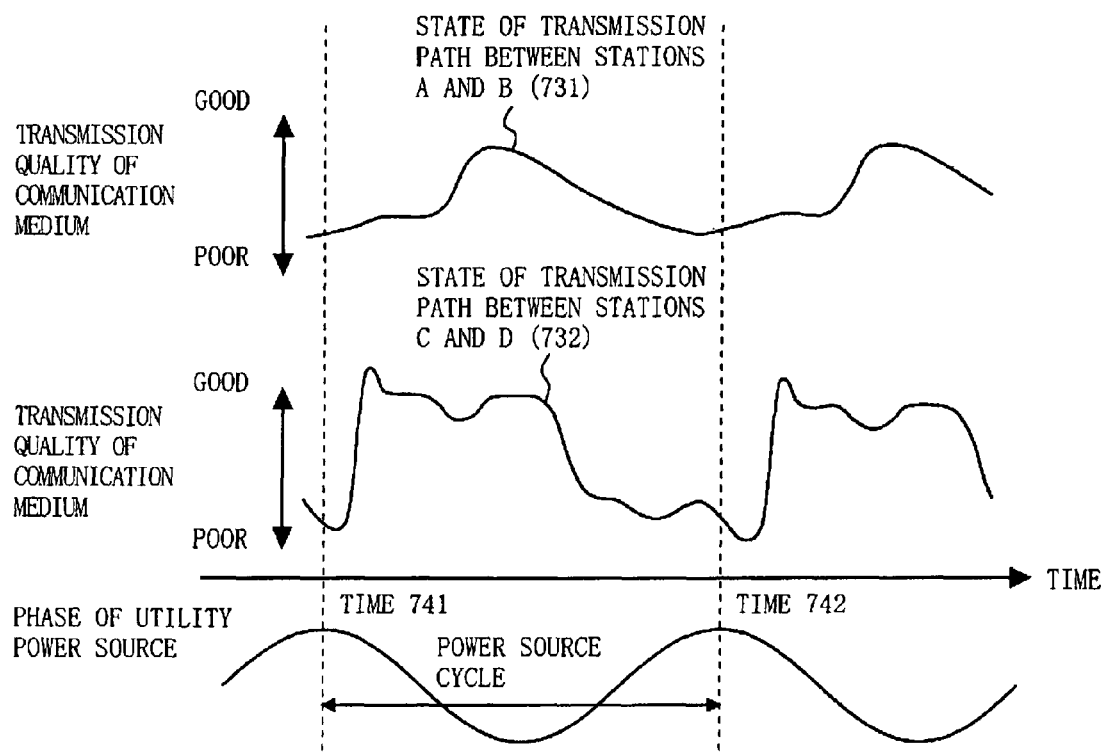
FIG. 20C is a diagram illustrating an exemplary fluctuation in transmission quality of different pairs of transmission/reception stations.

FIG. 14 is a diagram illustrating an exemplary data stream to be scheduled in the third embodiment. In each data stream, a transmission rate which is converted to a physical transmission rate and the presence or absence of retransmission are set. A first data stream 1601 requests a transmission rate of 12 Mbps. It is assumed that a time zone needs to be allocated to retransmission of the data stream 1601. A second data stream 1602 requests a transmission rate of 12 Mbps. It is assumed that a time zone does not need to be allocated to retransmission of the data stream 1602. The control station 111 schedules transmission of these two data streams 1601 and 1602 on a power line which has a change in a transmission quality of communication medium as illustrated in FIG. 10.

Also in the third embodiment, for the sake of simplicity, the frame structure of FIG. 9 is not taken into consideration. Specifically, calculation is performed without taking into consideration that the overhead due to the header 1001 is increased with an increase in the number of transmitted frames. As a sequence from transmission to retransmission of a data frame, a simplified sequence illustrated in FIG. 13B is used.

Next, a flow of scheduling in the third embodiment will be described by way of an example with reference to FIG. 14. When receiving an allocation request of the data stream 1601, the transmission schedule constructing section 2105 allocates a required time to the data stream 1601 from the scheduling cycle starting time 1321 in accordance with the scheduling policy (1). The data stream 1601 requires a physical transmission rate of 12 Mbps which is the same as that of the data stream 1501 in the second embodiment. Further, the data stream 1601 requires retransmission. Therefore, by performing calculation similar to that of the second embodiment, the transmission schedule constructing section 2105 allocates the slot 1331 and the slot 1332 to the data stream 1601.

Thereafter, the control station 111 receives an allocation request of the data stream 1602, resets a current scheduling result in accordance with the scheduling policy (4) (corresponding to step S2302 of FIG. 4), and performs rescheduling with respect to the data streams 1601 and 1602.

According to the scheduling policy (3), a slot having a stable medium state is allocated to the data stream 1602 which does not request retransmission. Therefore, the transmission schedule constructing section 2105 tries to allocate the slots 1331, 1332, and 1335 which can provide a stable physical transmission rate, but not the slots 1333 and 1334 which have a changing physical transmission rate, to the data stream 1602 (corresponding to step S2304 of FIG. 4). The transmission schedule constructing section 2105 determines whether or not a physical transmission rate is stable, depending on whether or not a change rate of the physical transmission rate is lower than or equal to a predetermined change rate. The data stream 1602 requires a physical transmission rate of 12 Mbps as illustrated in FIG. 14. Therefore, the transmission schedule constructing section 2105 allocates the slot 1331 which can provide a physical transmission rate of 60 Mbps which is five times higher than 12 Mbps, to the data stream 1602 so that the slot 1331 is occupied by the data stream 1602 every scheduling cycle. Taking into consideration that the slot 1331 occupies ⅕ of the entire time, the data stream 1602 can perform transmission in a manner that satisfies a requested transmission rate. According to the scheduling policy (2), the double time does not need to be allocated to a data stream which does not request retransmission. Therefore, the transmission schedule constructing section 2105 completes scheduling of the data stream 1602.

Next, the transmission schedule constructing section 2105 tries to perform scheduling with respect to the data stream 1601 (corresponding to step S2304 of FIG. 4). The data stream 1601 requires a physical transmission rate of 12 Mbps. Therefore, the transmission schedule constructing section 2105 can sufficiently perform scheduling with respect to the data stream 1601, if the slot 1332 and thereafter, which follow the data stream 1602, are allocated to the data stream 1601.

A defective frame rate of the data stream 1602 in a reception station will be discussed. The data stream 1602 is not retransmitted. Therefore, the defective frame rate of the data stream 1602 is equal to the frame error rate of the slot 1331, i.e., 0.01%.

In contrast, it is assumed that the scheduling policy (3) of the third embodiment, i.e., "a slot in which a medium state is stable is allocated to a data stream which is not transmitted", is not defined. In this case, scheduling with respect to an allocation request of the data stream 1601 is the same as that of the third embodiment. However, scheduling with respect to an allocation request of the following data stream 1602 has a different result. Specifically, the control station performs scheduling so that the data stream 1602 is placed immediately after the data stream 1601, in accordance with the scheduling policy (1). In other words, the data stream 1602 is scheduled into the slot 1333 and thereafter from the head without a space. The slot 1333 has an average physical transmission rate of 80 Mbps as illustrated in FIG. 11. The data stream 1602 requires a physical transmission rate of 12 Mbps. Therefore, the slot 1333 which can provide an average physical transmission rate about 6.6 (=80/12) times higher than 12 Mbps is occupied every scheduling cycle. Taking into consideration that the slot 1333 occupies ⅕ of the entire time, the data stream 1602 can be sufficiently transmitted.

In this case, however, since the slot 1333 having a frame error rate of 1% is used, the data stream 1602 which does not request retransmission has a defective frame rate of 1%. Therefore, the defective frame rate is 100 times higher than when the scheduling policy (3) is defined.

As described above, in the third embodiment, by allocating a slot having a stable medium state to a data stream which does not request retransmission, it is possible to suppress the defective frame rate of the data stream which does not request retransmission.

In the foregoing description, a condition of a data frame for allocation of a slot having a stable medium state is that the data frame which does not request retransmission. This is only for illustrative purposes, and the present invention is not limited to this. Specifically, in the present invention, information about request for data retransmission may be described in a QoS parameter designated in a schedule allocation request. The transmission schedule constructing section 2105 may construct a transmission schedule in accordance with a change in a transmission quality of communication medium so that the retransmission request described in the information is satisfied. The information about request for data retransmission may be information about whether or not retransmission is performed as described above, or an upper limit on repetition of retransmission (i.e., the maximum number of times of retransmission or a maximum retransmission time). When the upper limit of a data stream is smaller than a predetermined value, the transmission schedule constructing section 2105 may allocate a time zone having a change rate of a physical transmission rate which is lower than or equal to a predetermined change rate to the data stream. Note that, as described above, the transmission schedule constructing section 2105 may not only use an absolute value as a predetermined value, but also relatively compare maximum numbers of times of retransmission or maximum retransmission times. Specifically, the transmission schedule constructing section 2105 may relatively allocate a slot having a stable medium state to data streams in order of the maximum retransmission time or the maximum number of times of retransmission (smallest first).

In addition, the transmission schedule constructing section 2105 may allocate a slot having a higher average physical transmission rate to data which requests a lower maximum retransmission time or a lower maximum number of times of retransmission.

The three embodiments have been heretofore described. In these embodiments, the functional blocks, such as the frame transmitting section, the frame receiving section, the communication control section, and the like, are implemented as typical integrated circuits (LSI). These functional blocks may be mounted on respective separate chips, or alternatively, a part or the whole of the functional blocks may be mounted on a single chip. A portion involved in communication in the system itself and a portion involved in transmission/reception of a coexisting signal may be mounted on respective separate chips (LSIs) LSI may be called IC, system LSI, super LSI, or ultra LSI, depending on the packaging density.

The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used.

Further, if an integrated circuit technology which replaces LSI is developed by an advance in the semiconductor technology or other technologies derived therefrom, the functional blocks may be packaged using such a technology. A biotechnology may be applicable.

Note that the above-described embodiments can be each implemented by causing a CPU to execute a program capable of causing a CPU to execute the above-described procedure, the program being stored in a storage device (a ROM, a RAM, a hard disk, etc.). In this case, the program may be stored into the storage device via a recording medium before execution, or may be executed directly from the recording medium. The recording medium refers to a semiconductor memory, such as a ROM, a RAM, a flash memory or the like, a magnetic disk memory, such as a flexible disk, a hard disk or the like, an optical disc, such as a CD-ROM, a DVD, a BD or the like, a recording medium, such as a memory card or the like. The recording medium is a concept including a communication medium, such as a telephone line, a transfer line or the like.

Home communication apparatuses including the present invention may be in the form of an adaptor which converts a signal interface, such as Ethernet (registered trademark) interface, IEEE1394 interface, USB interface, or the like, to interface for power line communication, and thereby can be connected to multimedia apparatuses, such as a personal computer, a DVD recorder, a digital television, a home system server, and the like, which have various types of interface. Thereby, a network system which transmits digital data, such as multimedia data or the like, via a power line with high speed, can be constructed. As a result, a power line which is already provided in home, offices and the like can be used as a network line without newly introducing a network cable, such as a conventional wired LAN. Therefore, the present invention is considerably useful in terms of cost and simplicity of installation.

Functions including the present invention may be incorporated into a multimedia apparatus, such as a personal computer, a DVD recorder, a digital television, a home server system or the like, in the future. Thereby, data transfer between apparatuses can be achieved via a power source cable of the multimedia apparatus. In this case, an adaptor, an Ethernet® cable, an IEEE1394 cable, a USB cable, and the like are not required, thereby simplifying wiring.

Also, the high-speed power line transmission system of the present invention can be connected via a rooter to the Internet, or via a hub to a wireless LAN or a conventional wired cable LAN, thereby extending a LAN system in which the high-speed power line transmission system of the present invention is used without any problem.

Communication data transferred via a power line by power line transmission may be intercepted by an apparatus directly connected to the power line, but is free from an eavesdrop problem with wireless LAN. Therefore, the power line transmission scheme is effective for data protection in terms of security. Further, data transferred on a power line may be protected by IPSec of an IP protocol, encryption of the contents themselves, other DRM schemes, or the like.

As compared to conventional power line communication, high-quality AV content transmission on a power line can be achieved by using the above-described copyright protection function using encryption of contents and efficient communication media (an effect of the present invention), and further implementing a QoS function.

While the invention has been described in detail, the foregoing description is in all aspects illustrative and not restrictive. It is understood that numerous other modifications and variations can be devised without departing from the scope of the invention.

INDUSTRIAL APPLICABILITY

The transmission schedule constructing apparatus of the present invention provides a scheduling function for transmitting data with high efficiency and high quality in power line communication, and is useful for a power line communication modem, various electric appliances having a power line communication function, and the like.

The invention claimed is:

1. A transmission schedule constructing apparatus capable of constructing a transmission schedule for stations on a power line communication network, the transmission schedule being for use in time division multiple access of the stations on the power line that is a communication medium, the transmission schedule constructing apparatus comprising:

an allocation request receiving section operable to receive a schedule allocation request from within the transmission schedule constructing apparatus and/or from other stations, the schedule allocation request designating a parameter relating to transmission quality; and a transmission schedule constructing section operable to construct the transmission schedule based on a cyclic change in a transmission quality of the power line depending on an alternating current power source cycle and based on the parameter relating to transmission quality and designated in the schedule allocation request, wherein the parameter relating to transmission quality and designated in the schedule allocation request describes a transmission rate requested for data to be scheduled, wherein a scheduling policy for construction of the transmission schedule and relating to the transmission rate is previously set in the transmission schedule constructing section, wherein a rule is set in the scheduling policy, such that the rule set in the scheduling policy allocates a time zone, at which a higher physical transmission rate is provided, for data requesting a higher transmission rate, when the data is requesting the higher transmission rate and other data is requesting a lower transmission rate, and wherein the transmission schedule constructing section constructs the transmission schedule by (i) resetting a current transmission schedule when a new schedule allocation request is received by the allocation request receiving section, and (ii) trying to perform an allocation (a) for all schedule allocation requests currently received and (b) that is in accordance with the scheduling policy and the rule set in the scheduling policy, so that the transmission rate described in the parameter is satisfied, such that, when the allocation is successful for all of the schedule allocation requests, the transmission schedule is constructed using the successful allocation and is output, and such that, when the allocation is not successful for all of the schedule allocation requests, the reset transmission schedule is recovered to be used as the transmission schedule.

2. The transmission schedule constructing apparatus according to claim 1, wherein the transmission schedule constructing section constructs the transmission schedule in units of the alternating current power source cycle or in units of an integral multiple of a half of the alternating current power source cycle.

3. The transmission schedule constructing apparatus according to claim 1, wherein the change in the transmission quality is a change in a physical transmission rate between stations transmitting/receiving the data to be scheduled.

4. The transmission schedule constructing apparatus according to claim 3, wherein the alternating current power source cycle or an integral multiple of a half of the alternating current power source cycle is divided into a plurality of time intervals, and the change in the transmission quality is represented by a change in an estimated average physical transmission rate of each of the time intervals.

5. The transmission schedule constructing apparatus according to claim 3, wherein the physical transmission rate between the stations transmitting/receiving the data to be scheduled is obtained by an evaluation of a transmission path between the stations.

6. The transmission schedule constructing apparatus according to claim 1, wherein:

the change in the transmission quality is a change in a physical transmission rate between stations transmitting/receiving the data to be scheduled; and the transmission schedule constructing section allocates a time zone capable of providing a physical transmission rate, which is higher than or equal to a predetermined second rate, to data requesting a transmission rate higher than or equal to a predetermined first rate.

7. The transmission schedule constructing apparatus according to claim 1, wherein:

the change in the transmission quality is a change in a physical transmission rate between stations transmitting/receiving the data to be scheduled; and the transmission schedule constructing section allocates a time zone that can provide a higher physical transmission rate to the data to be scheduled that requests a higher transmission rate.

8. A transmission schedule constructing apparatus capable of constructing a transmission schedule for stations of a power line communication network, the transmission schedule being for use in time division multiple access of the stations on the power line that is a communication medium, the transmission schedule constructing apparatus comprising:

an allocation request receiving section operable to receive a schedule allocation request from within the transmission schedule constructing apparatus and/or from other stations, the schedule allocation request designating a parameter relating to transmission quality; and a transmission schedule constructing section operable to construct the transmission schedule based on a cyclic change in a transmission quality of the power line depending on an alternating current power source cycle and based on the parameter relating to transmission quality and designated in the schedule allocation request, wherein the parameter relating to transmission quality and designated in the schedule allocation request describes a transmission delay time tolerated by data to be scheduled, wherein a scheduling policy for construction of the transmission schedule and relating to the transmission delay time is previously set in the transmission schedule constructing section, wherein a rule is set in the scheduling policy, such that the rule set in the scheduling policy allocates a time at which a higher physical transmission rate is provided for data requesting a higher transmission rate in the parameter relating to transmission quality, wherein the transmission schedule constructing section constructs the transmission schedule by (i) resetting a current transmission schedule when a new schedule allocation request is received by the allocation request receiving section, and (ii) trying to perform an allocation (a) for all schedule allocation requests currently received and (b) that is in accordance with the scheduling policy and the rule set in the scheduling policy, so that the transmission delay time described in the parameter is satisfied, such that, when the allocation is successful for all of the schedule allocation requests, the transmission schedule is constructed using the successful allocation and is output, and such that, when the allocation is not successful for all of the schedule allocation requests, the reset transmission schedule is recovered to be used as the transmission schedule, wherein the change in the transmission quality is a change in a physical transmission rate between stations transmitting/receiving the data to be scheduled, and wherein the transmission schedule constructing section allocates a time zone that can provide a lower change rate of the physical transmission rate to data requesting a smaller transmission delay time.

9. The transmission schedule constructing apparatus according to claim 8, wherein the transmission schedule constructing section allocates a time zone capable of providing a change rate of the physical transmission rate, which is lower than or equal to a predetermined change rate, to data requesting a transmission delay time lower than or equal to a predetermined delay time.

10. A method, executed by a transmission schedule constructing apparatus, for constructing a transmission schedule for stations on a power line communication network, the transmission scheduling being for use in time division multiple access of the stations on the power line that is a communication medium, the method comprising:

receiving, using an allocation request receiving section, a schedule allocation request from within the transmission schedule constructing apparatus and/or from other stations, the schedule allocation request designating a parameter relating to transmission quality; and constructing, using a transmission schedule constructing section, the transmission schedule based on a cyclic change in a transmission quality of the communication medium depending on an alternating current power source cycle on the power line and based on the parameter relating to transmission quality and designated in the schedule allocation request, wherein the parameter relating to transmission quality and designated in the schedule allocation request describes a transmission rate requested for data to be scheduled, wherein a scheduling policy for construction of the transmission schedule and relating to the transmission rate is previously set in the transmission schedule constructing section, wherein a rule is set in the scheduling policy, such that the rule set in the scheduling policy allocates a time zone, at which a higher physical transmission rate is provided, for data requesting a higher transmission rate, when the data is requesting the higher transmission rate and other data is requesting a lower transmission rate, and wherein the transmission schedule constructing section constructs the transmission schedule by (i) resetting a current transmission schedule when a new schedule allocation request is received by the allocation request receiving section, and (ii) trying to perform an allocation (a) for all schedule allocation requests currently received and (b) that is in accordance with the scheduling policy and the rule set in the scheduling policy, so that the transmission rate described in the parameter is satisfied, such that, when the allocation is successful for all of the schedule allocation requests, the transmission schedule is constructed using the successful allocation and is output, and such that, when the allocation is not successful for all of the schedule allocation requests, the reset transmission schedule is recovered to be used as the transmission schedule.

11. An integrated circuit capable of constructing a transmission schedule for stations on a power line communication network, the transmission schedule being for use in time division multiple access of the stations on the power line that is a communication medium, the integrated circuit comprising:

an allocation request receiving section operable to receive a schedule allocation request from within the integrated circuit and/or from other stations, the schedule allocation request designating a parameter relating to transmission quality; and a transmission schedule constructing section operable to construct the transmission schedule based on a cyclic change in a transmission quality of the power line depending on an alternating current power source cycle and based on the parameter relating to transmission quality and designated in the schedule allocation request, wherein the parameter relating to transmission quality and designated in the schedule allocation request describes a transmission rate requested for data to be scheduled, wherein a scheduling policy for construction of the transmission schedule and relating to the transmission rate is previously set in the transmission schedule constructing section, wherein a rule is set in the scheduling policy, such that the rule set in the scheduling policy allocates a time zone, at which a higher physical transmission rate is provided, for data requesting a higher transmission rate, when the data is requesting the higher transmission rate and other data is requesting a lower transmission rate, and wherein the transmission schedule constructing section constructs the transmission schedule by (i) resetting a current transmission schedule when a new schedule allocation request is received by the allocation request receiving section, and (ii) trying to perform an allocation (a) for all schedule allocation requests currently received and (b) that is in accordance with the scheduling policy and the rule set in the scheduling policy, so that the transmission rate described in the parameter is satisfied, such that, when the allocation is successful for all of the schedule allocation requests, the transmission schedule is constructed using the successful allocation and is output, and such that, when the allocation is not successful for all of the schedule allocation requests, the reset transmission schedule is recovered to be used as the transmission schedule.

* * * * *